United States Patent

Henderson et al.

[15] 3,665,169

[45] May 23, 1972

[54] ELECTRONIC MEASURING UNIT

[72] Inventors: Robert M. Henderson, Williams Bay; Richard Zechlin; Lowell E. Miller, both of Beloit, all of Wis.

[73] Assignee: Fairbanks Morse Inc., New York, N.Y.

[22] Filed: Oct. 17, 1969

[21] Appl. No.: 867,140

[52] U.S. Cl.................235/151.3, 235/151.33, 235/92, 177/25

[51] Int. Cl............................................G06f 7/46

[58] Field of Search........235/151.3, 151.33, 92 MT, 92 WT, 235/92 EV, 183; 177/3, 7, 17, 25, 211

[56] References Cited

UNITED STATES PATENTS

| 3,378,676 | 4/1968 | Clement | 235/151.3 |
| 3,375,357 | 3/1968 | Dekker et al. | 235/151.33 X |
| 3,393,302 | 7/1968 | Cichanowicz et al. | 235/151.33 |
| 3,439,524 | 4/1969 | Rogers | 235/151.33 X |

Primary Examiner—Malcolm A. Morrison
Assistant Examiner—Edward J. Wise
Attorney—Daniel W. Sixbey

[57] ABSTRACT

The electronic measuring unit is a logic controlled system which is programmed by a clock control unit. A unit for producing a digital output indicative of a function to be measured is connected to feed a read up and down counter and indicator unit. This counter and indicator unit has the capability to provide an indication of the difference between a previous measurement and one or more subsequent measurements, the value of a single measurement, the difference between a measurement and a preset value, or the value of only a portion of a total value applied to a measuring sensor for the measuring unit. Additionally, the electronic measuring unit is adapted to automatically round off value indications and to zero itself when drift within predetermined limits occurs.

64 Claims, 16 Drawing Figures

INVENTORS
Robert M. Henderson
Richard Zechlin
Lowell E. Miller
Daniel W Sibley
ATTORNEY INVENTORS
Robert M. Henderson
Richard Zechlin
Lowell E. Miller
Daniel W. Sibley
ATTORNEY INVENTORS
Robert M. Henderson
Richard Zechlin
Lowell E. Miller
BY Daniel W Sipley
ATTORNEY Patented May 23, 1972
3,665,169
15 Sheets-Sheet 12
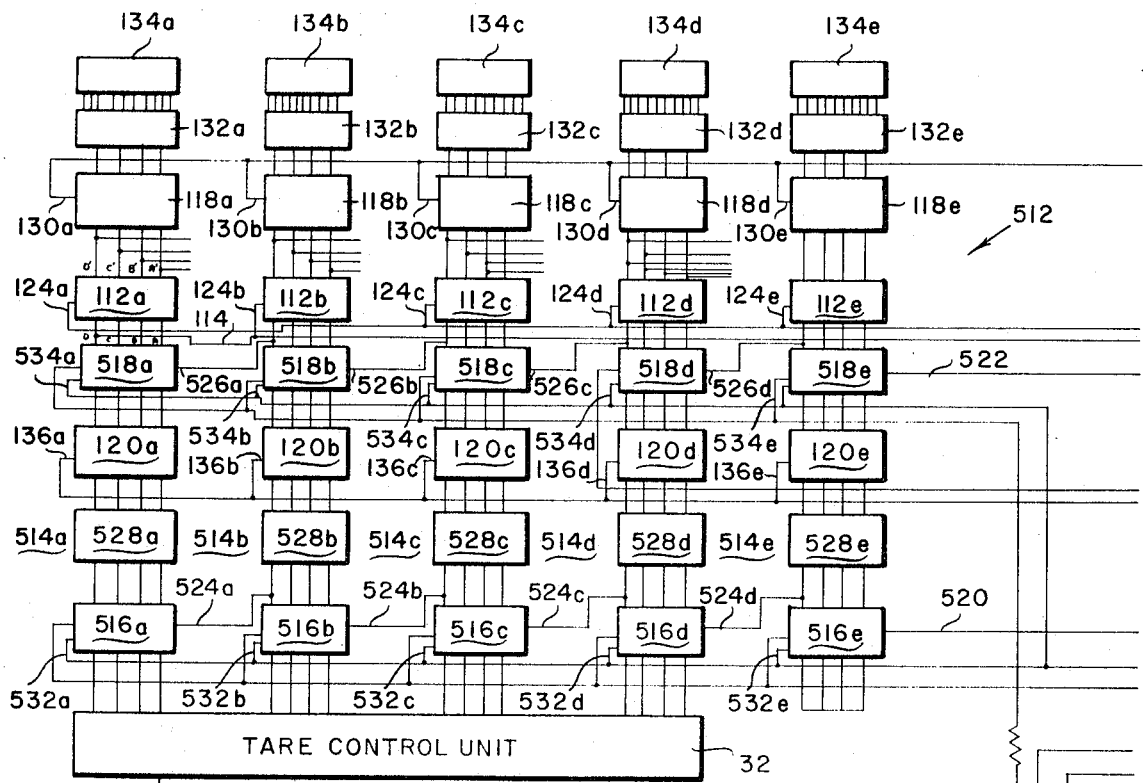
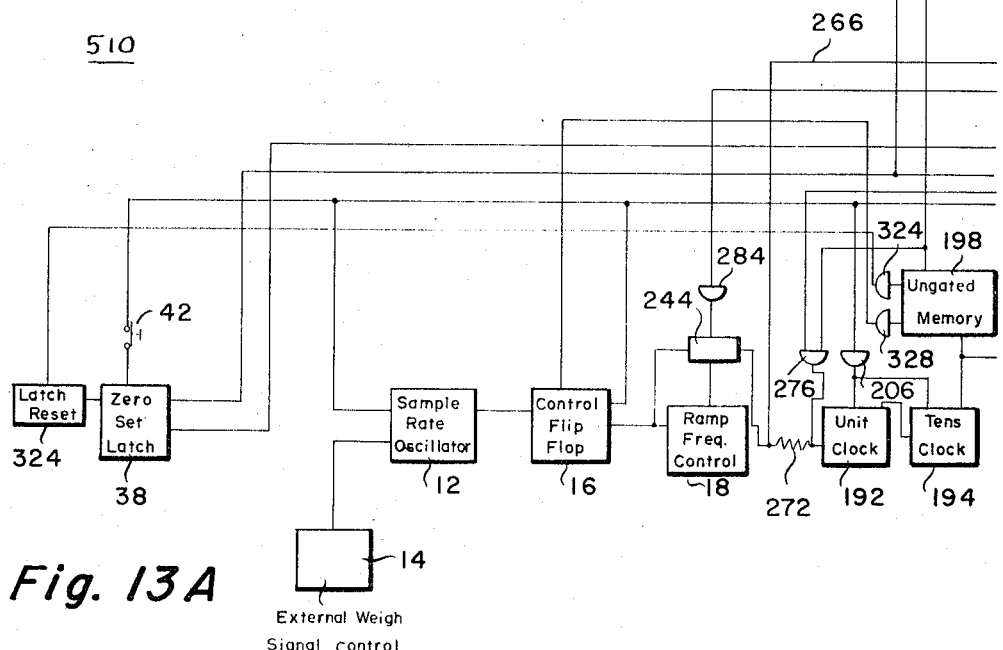
Fig. 13A
INVENTORS
Robert M. Henderson
Richard Zechlin
Lowell E. Miller
Daniel W. Sibley
BY ATTORNEY INVENTORS
Robert M. Henderson
Richard Zechlin
Lowell E. Miller
Daniel W. Sibley
BY ATTORNEY Patented May 23, 1972

INVENTORS
Robert M. Henderson
Richard Zechlin
Lowell E. Miller
BY Daniel W. Sifley
ATTORNEY

ELECTRONIC MEASURING UNIT

A number of electronic measuring systems capable of providing a digital indication representative of a value to be measured have been developed. These systems are generally limited to a single, specific use; namely the indication of the value of a single sensed function. Such systems are not capable of combining a number of successive measuring operations to indicate comparative values obtained from successive measurements.

All electronic measuring systems are subject to drift due to temperature, mechanical, environmental and other effects inherent in such systems. It is desirable to provide both manual and automatic means for accurately compensating for the effects of such drift.

It is a primary object of the present invention to provide a novel and improved electronic measuring unit capable of providing comparative measurement indications during two or more successive measuring cycles.

Another object of the present invention is to provide a novel and improved electronic measuring unit operative in response to program control logic signals from a central clock control unit.

A further object of the present invention is to provide a novel and improved electronic measuring unit which is adapted to indicate portions of a total sensed value which are added to said sensed value during successive measuring operations while maintaining the total value of said portions.

Another object of the present invention is to provide a novel and improved electronic measuring unit which is adapted to compare values obtained during successive measurements.

A further object of the present invention is to provide a novel and improved electronic measuring unit which may be manually set to 0 and which thereafter automatically deducts the value indicated prior to zeroing from that obtained subsequent to zeroing.

Another object of the present invention is to provide a novel and improved electronic measuring unit which will automatically zero to compensate for drift within predetermined ranges.

A further object of the present invention is to provide a novel and improved electronic measuring unit which is adapted to automatically round off an indicated value to a nearest predetermined indication.

Another object of the present invention is to provide a novel and improved electronic measuring unit adapted to take a plurality of measurements during each measuring cycle and having means to adjust the time of such measurements to minimize inherent errors due to input oscillations.

A further object of the present invention is to provide a novel and improved electronic measuring unit which includes input means to minimize A.C. variations in an input signal.

Another object of the present invention is to provide a counter and indicator system for an electronic measuring unit which includes a sensing and control unit for sensing the most significant digit registered in a counter unit for said system and providing a control signal dependent upon the occurrence or non occurrence of a transition of said most significant digit to cause said system to provide an output which is indicative of the actual numerical value entered in said counter unit or the complement thereof.

A further object of the present invention is to provide a novel and improved electronic measuring unit having a counter and indicator system adapted to store an indication representative of a previously measured value for subsequent comparison or indication.

A still further object of the present invention is to provide a novel and improved electronic measuring unit having means to enter a manually preset value into a counter and indicator unit therefor to be deducted from a subsequently measured value.

Other objects, features and attendant advantages of this invention will become apparent from a consideration of the following description taken in conjunction with the accompanying drawings in which.

Figure 13B:
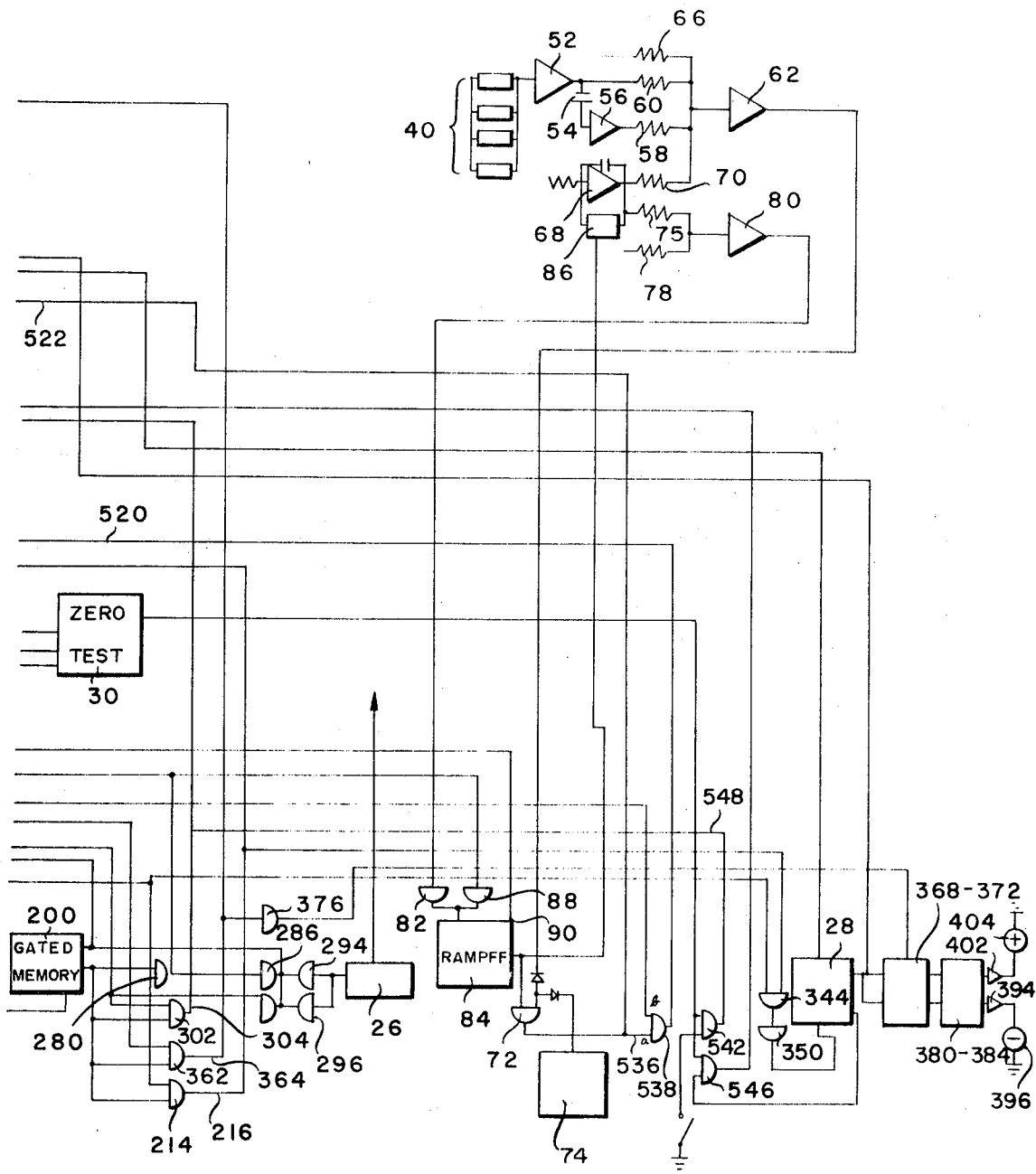
Figure 14:
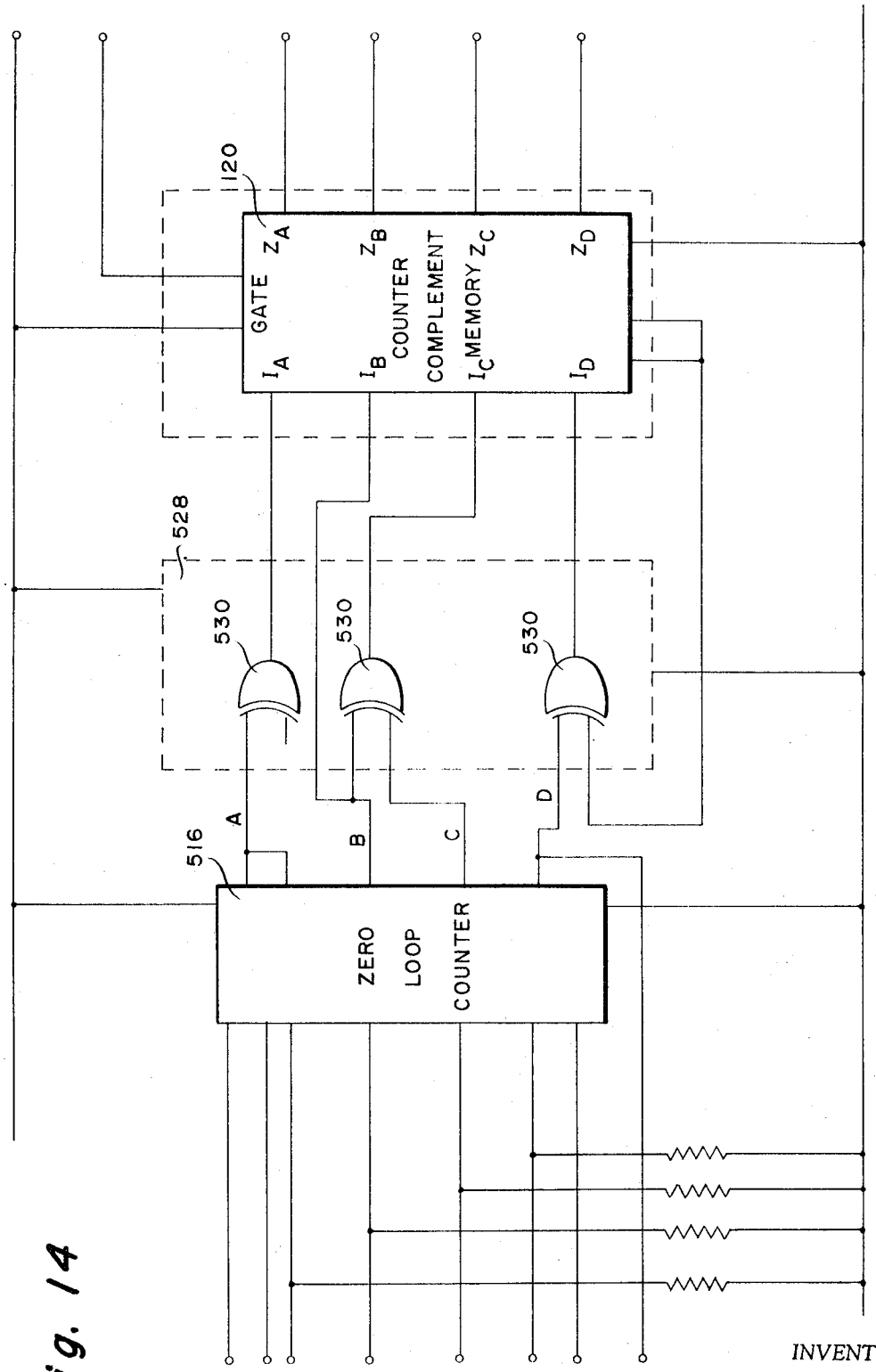

FIGS. 13a and 13b comprise a detailed block diagram of a second embodiment of the electronic measuring unit of the present invention;

FIG. 14 is a block diagram of the zero loop counter section of FIG. 13; and

Figure 12:
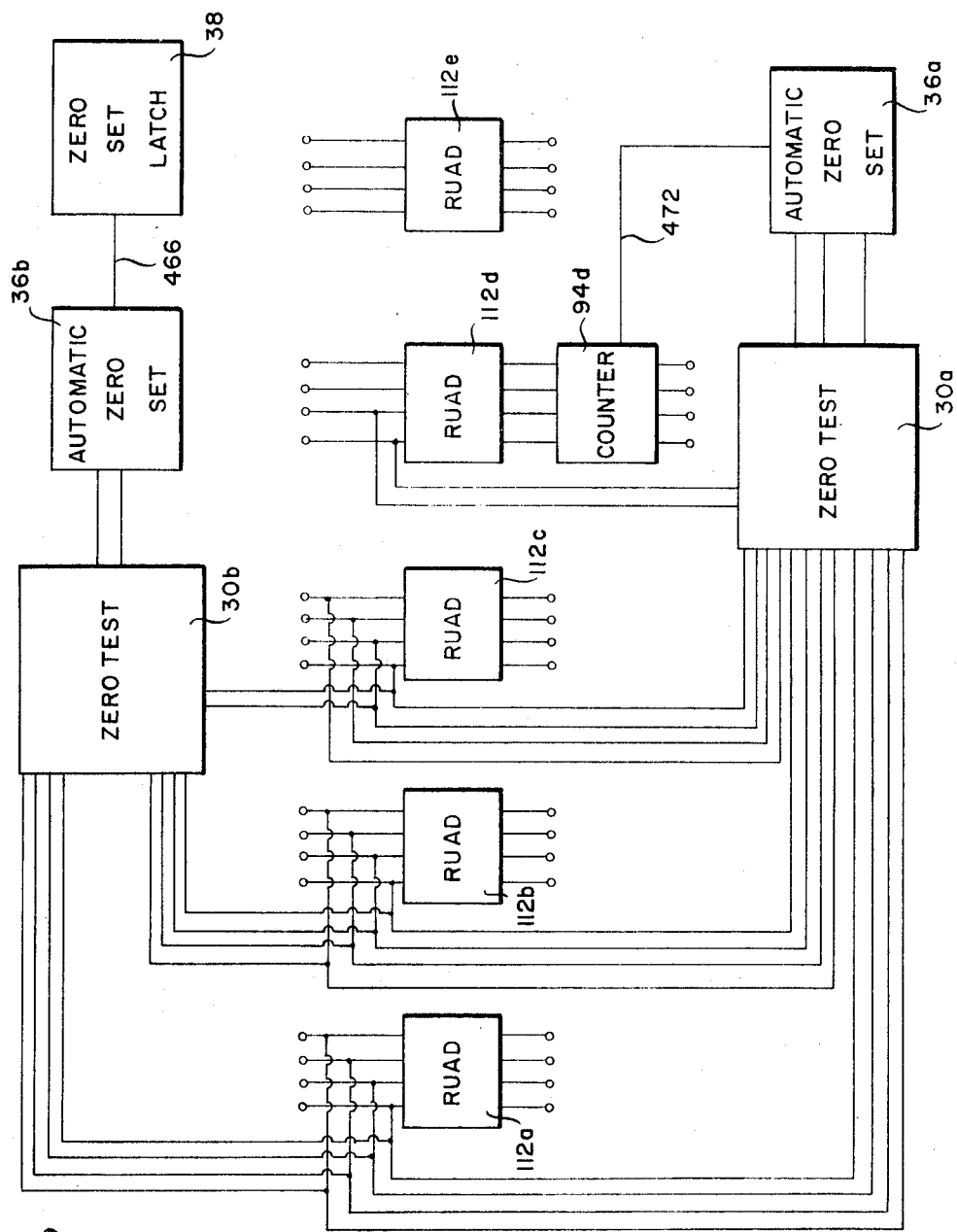
FIG. 12 is a block diagram of a second embodiment of the zero test unit and automatic zero set unit of the present invention.
Figure 15:
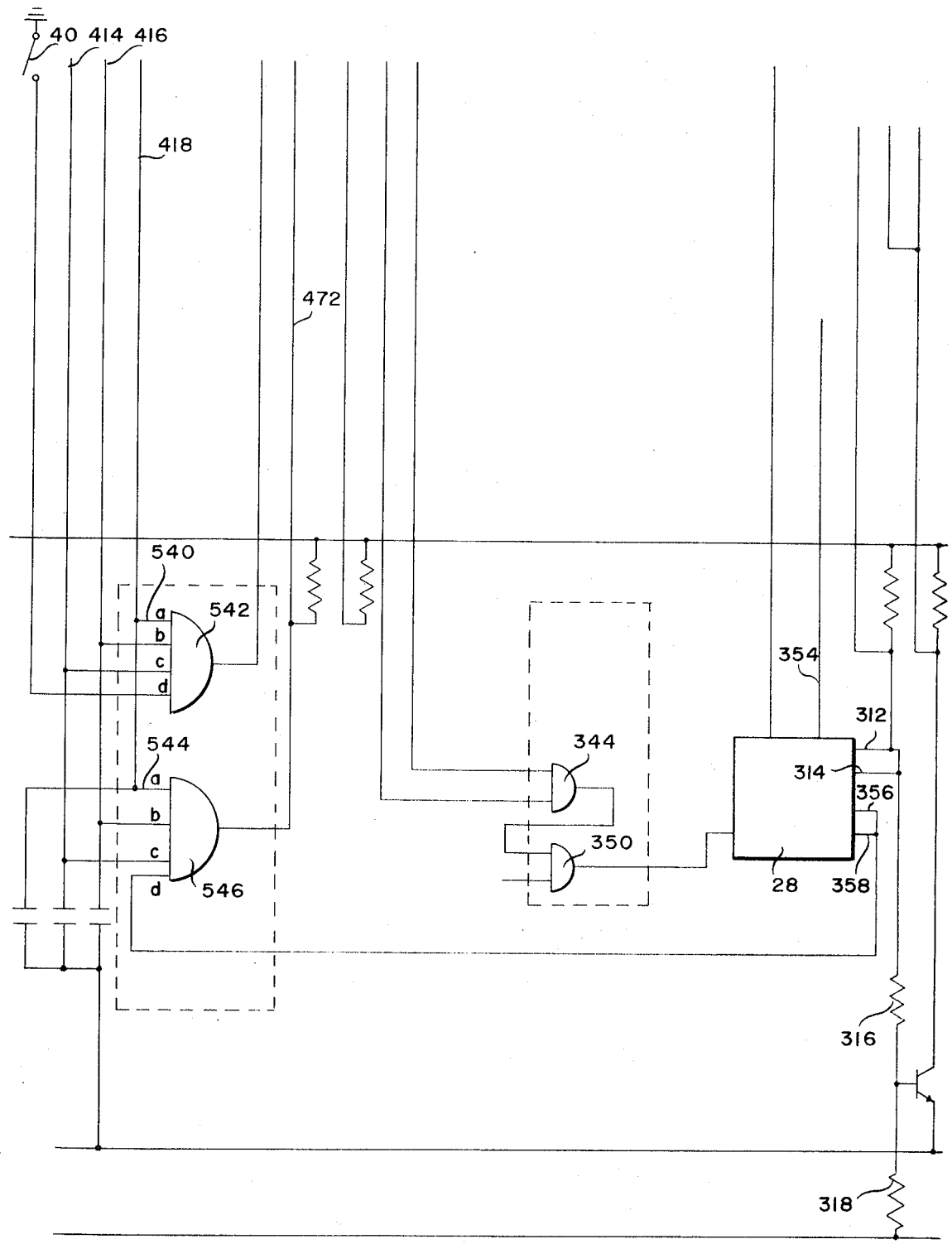

FIG. 15 is a circuit diagram of the automatic zeroing unit of FIG. 12.

The novel electronic measuring system of the present invention basically constitutes a clock controlled measuring system which is programmed through a sequence of operations by a clock control circuit. The program followed by the measuring system may be expeditiously altered by the operation of simple control mechanisms to adapt the system operation for a new function. For purposes of description, the programmed functions of the electronic measuring system of this invention will be classified into four major catagories; namely, zero set operation, not zero set operation, tare setting, and automatic clamping.

The zero set operation of the electronic measuring system is a push button activated function, although an automatic zero set system to correct measuring system drift will be subsequently described as a measuring system component. The manual zero set operation provides the ability to zero the system by activation of a single push button. In zero set operation, the system senses an input function and registers this function in the form of a positive digital number. This input function is then remembered, however, as the complement of the digital number, and prior to the accomplishment of a subsequent measurement by the system, the number complement is placed in a novel counter arrangement. Then, as the system takes a subsequent measurement during a not zero set operation, it must count toward 0 until the prior stored function is counted out, and then continue to count through 0 for a positive indication. Thus it is seen that in zero set operation, the electronic measuring system of the present invention simply takes the measurement of an existing function present at the input to the system and stores this information so that the stored value may be deducted from values obtained from subsequent measurements to be taken.

The ability of the system to accomplish a push button zero set operation while remembering a previously measured value adapts the system for a wide variety of measuring uses. For example, a plurality of individual measurements may be taken without losing the total measurement resulting from the successive individual measurements. Applying this principal to a weighing application, the weights of individual packages may be determined as they are added to a partially loaded pallet without removing the pallet from the weigh platform for each measurement. The process employed is to use the zero set button to re-zero the system with the addition of each package, thereby obtaining the weight of the added package only. However, totals of each individual package added may be obtained from a normal electronic accumulator.

In another application, the zero set operation may be used for down measurements. Applying this to a weighing application, down weighing may be accomplished by zero setting the system when the full weight of a plurality of parts is applied to the weigh platform. When the weight is removed, the count toward 0 from the zero set complement never reaches or passes through zero. For example, in zero set with an applied load of 485.50 lbs., the removal of 25 lb. weight will cause the system to count toward 0, but only to 460.50 lbs. and to indicate minus 25 lbs. By coupling the down-weighing concept to push button zero set, an incremental reduction in weight can be obtained. Such a system is useful in obtaining measurements, such as fuel rates for diesel or gasoline engines.

The tare function of the measuring system is accomplished in coordination with the zero set function, and may occur during a zero set operation. The tare function permits an operator to manually insert a known value into the system for future comparison with values to be subsequently measured. For example, in a weighing system, the tare control could be employed to set the weight of containers for material to be weighed into the system. If the weight of such containers is entered as the complement of the weight value, the system must count toward 0 until this weight is counted out, and only the actual weight within the container will be finally indicated.

In the not zero set operation of the measuring system, the system will measure the difference between a measurement formerly taken and an existing measurement. The not zero set function can be employed to indicate a measurement which is greater than 0, a measurement which is less than 0, a measurement which is greater than 0 but less than some minimum amount, or a measurement which is less than 0 but greater than some minimum amount.

Finally, the automatic clamping function of the measuring system can be employed to provide a continuous indication of zero when the measuring system receives no input. Sometimes, because of drift, the no input indication will read other than 0, although the drift is small. In simple terms, the zero clamping system incorporated within the measuring system of the present invention looks at all digits recorded in a counter system above the least significant digit to see if they are 0 when no measurement is being taken. It also looks at the least significant digit and determines whether it is lower in value than a pre-chosen number. When this condition exists, it makes all numbers in the output indicator for the counter system read 0, even though a small drift has occurred.

Zero clamping is employed in cooperation with an automatic zero set unit to accomplish continuous zero adjustment to overcome the problem of drift from 0 between push button zero adjustments. Although the push button zero set operation of the measuring system is advantageous in that it removes the element of operator judgement as to whether he has set 0 precisely into the system, it does not overcome the problem of drift between zero adjustments. The continuous automatic zero feature of this system uses the features of push button zeroing and zero clamp in a unique manner to obtain continuous zeroing. For example, after push button zero set has been accomplished to initially zero the system, a not zero set measuring cycle is initiated to accomplish a measurement. It is obvious that if no input to the system is forthcoming, the resultant indication should be 0. In practice, however, this is not precisely true, for the electronic system will have possibly drifted from 0 a slight amount. At this point, the zero clamp is used. If the resultant is sufficiently close to 0 to actuate the zero clamp, then the zero set cycle will be automatically initiated to rezero the system at this slightly different, new value, thus continuously adjusting for zero drift.

The operational functions of the electronic measuring system of the present invention will be better understood from the subsequent description of the system and its operation.

GENERAL MEASURING SYSTEM

Figure 1:
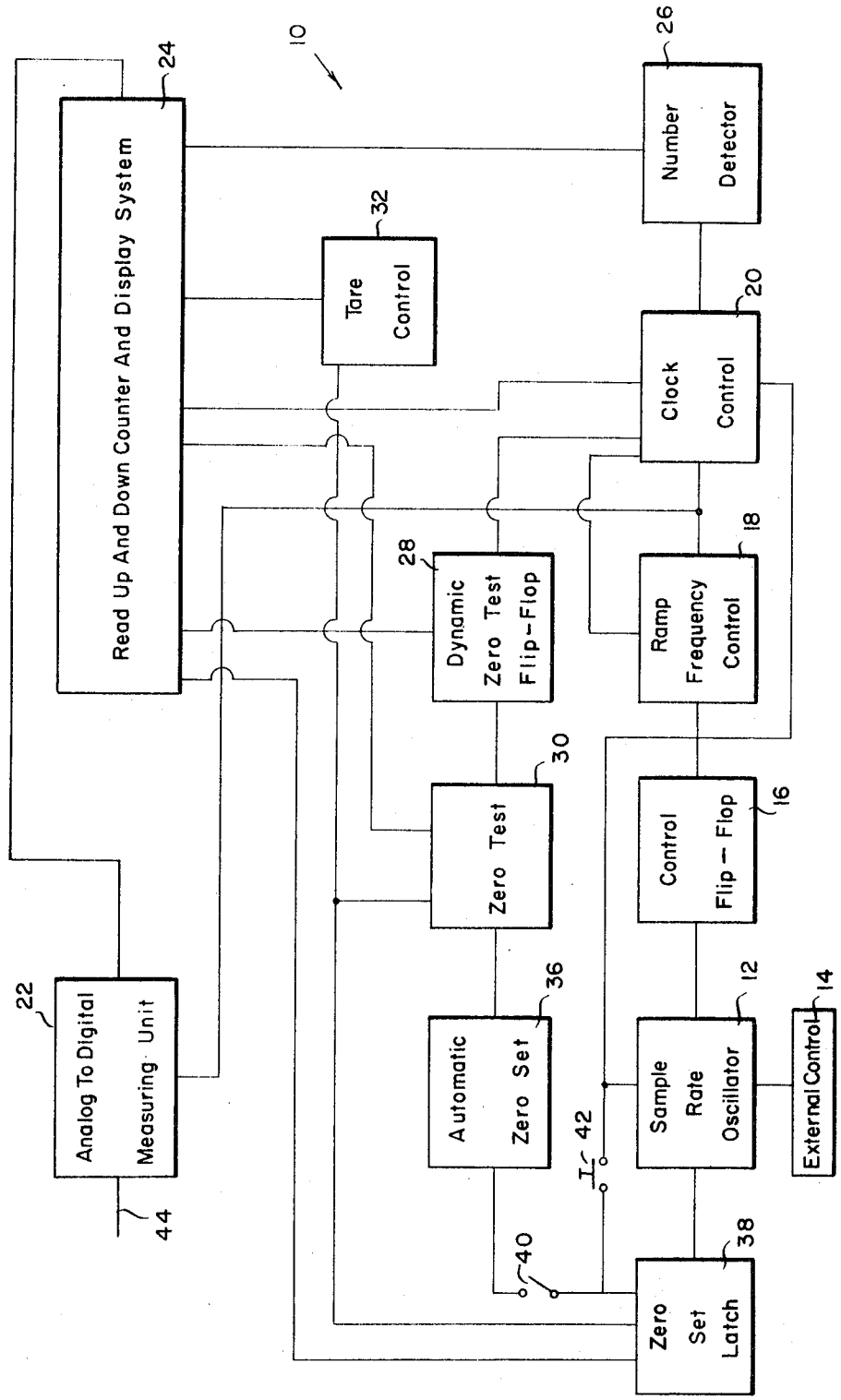
FIG. 1 is a basic block diagram illustrating the major components of the electronic measuring unit of the present invention.

Referring now to the drawings, FIG. 1 constitutes a simplified block diagram of the electronic measuring system of the present invention which is employed to illustrate the general system construction and operation. The electronic measuring system indicated generally at 10 includes a sample rate oscillator 12, which may constitute a free running oscillator with internal control or an oscillator which operates under the control of an external signal from an external control unit 14. This external control unit may be a sensor or similar control associated with the entity to be measured.

The sample rate oscillator 12 is connected to a control flip flop 16, the output of which is connected back to the sample rate oscillator, and also to a ramp frequency control 18, and a clock control 20. The output of the ramp frequency control is connected to the clock control 20 and also to a digital output measuring unit 22 which provides a digital output signal indicative of a quantity to be measured. This output signal is directed to a read up and down counter and display system 24.

For purposes of description, the digital output measuring unit will be described as an analog to digital measuring unit which provides a digital output signal indicative of an analog input signal. This is the most common system employed for electronic measuring applications, but it is recognized that the electronic measuring unit 10 will function with any digital output measuring unit 22 which will operate in response to a control pulse to provide a digital output indicative of a function to be measured.

The clock control 20 forms the program control center for the electronic measuring unit 10, and operates in accordance with information signals received from various system sources to provide output control signals to operational units within the system. For example, the clock control unit 20 receives information signals from a number detector 26 which is connected to sense predetermined numerical conditions in the read up and down counter and display system 24.

The clock, control 20 is connected to control numerous functions in the read up and down counter and display system 24, as well as functions of a dynamic zero test flip flop 28. The dynamic zero test flip flop is connected to the read up and down counter and display system and also to a zero test unit 30. The zero test unit is connected to the read up and down counter and display system. Also a tare control unit 32 is connected to the read up and down counter and display system. Additionally, the zero test unit is connected to an automatic zero set unit 36 which operates a connection 40 to a zero set latch 38. Also the zero set latch may be manually connected to the control flip flop by a zero set switch 42. The zero set latch 38 is connected to provide control functions to the read up and down counter and display system, tare control unit 32, and zero test unit 30.

Considering now the general operation of the measuring system 10 of FIG. 1, the switch 42 may be closed to initiate zero set operation of the measuring system. This will trigger the sample rate oscillator 12 into operation. As previously indicated, the sample rate oscillator may be free running with internal controls.

The sample rate oscillator provides an output to the control flip flop 16, which changes state and locks the sample rate oscillator. Also, the change of state of the control flip flop 16 provides control signals to the clock control 20 to remove the reset previously applied to the clock control and to set gate circuits therein. Finally, the output from the control flip flop triggers a ramp period oscillator in the ramp frequency control 18, and this ramp period oscillator sets the toggling rate of the clock control 20. Actually, the ramp frequency control unit toggles the clock control at two different rates, with the faster rate being present during non-ramping conditions in the analog to digital measuring unit 22.

For purposes of description, the total clock control program provided by the clock control 20 will be assumed to be a 40 count control program with each 10th count constituting a transition to a new functional division in the program. Thus, the system will be described in accordance with the functions accomplished during counts 0-9, 10-19, 20-29, and 30-39, with count 40 terminating the operational cycle of the system. It will of course be understood that other clock count programs could be employed.

During clock division 0–9, the control flip flop 16 locks the sample rate oscillator, provides control signals to the clock control, and triggers the ramp frequency control as previously described. In response to operation of the clock control, strobe signals are provided to counters in the read up and down counter and display system 24, and any value present at the counter inputs is strobed into the counters. If no input is present, the counters remain at 0. Thus during a 0–9 clock cycle, any tare value which has been set into the tare control 32 is strobed into the read up and down counter and display system.

When the clock output from the clock control 20 changes from clock 9 to 10, the ramp frequency oscillator in the ramp frequency control unit 18 is caused to decrease the clock pulse rate and to toggle the analog to digital measuring unit 22 into operation. This unit takes an input analog signal indicative of a value to be measured and converts the signal to a related digital signal. The input analog signal may be provided by any of a number of known sensing units having an analog output signal to an input 44 for the analog to digital measuring unit, and the digital output from the measuring unit is registered in the read up and down counter and display system 24. This measuring operation of the analog to digital measuring unit normally occurs during the clock period involving clock pulses 10–19, and for averaging purposes, it is possible to have each clock pulse trigger an individual measuring cycle of the analog to digital measuring unit.

At the termination of clock pulse 19 during zero set operation, the analog to digital measuring unit is disabled and the ramp frequency control unit 18 is caused to again initiate clock pulses at the higher frequency of the clock pulses 0–9. The number detector 26 is disabled, so that no sensing thereby of the value stored in the read up and down counter and display system occurs.

During clocks 20–29, counter indications are processed in the read up and down counter and display system 24 in a manner to be subsequently described, and during clock 30–39 the zero set latch 38 is released. Upon the occurrence of clock 40, the lock on the sample rate oscillator 12 is removed, the counters in the read up and down counter and display system 24 are reset, and the clock control 20 is reset. The measuring system 10 has now completed a zero set cycle.

The not-zero set operation of the electronic measuring unit 10 is basically similar to the zero set operation, with the exception that the number detector 26, the dynamic zero test flip flop 28, the zero test unit 30 and the automatic zero set unit 36 may be brought into operation.

During the 0–9 count of the clock control 20, the compliment of a measurement value taken during a previous measuring cycle of the analog to digital measuring unit 22 is taken from storage in the read up and down counter and display system 24 and entered into the counters thereof. Thus, the count taken during the next measuring cycle of the analog to digital measuring unit 22 must count through the complement entered in the counters for the read up and down counter and display system.

At the end of clock 19 during not-zero set operation, the most significant digit, namely the highest digit, in the counters for the read up and down counter and display system is sensed, and if a change of state has occurred since clock 10, (from a 9 indication to a 0) the dynamic zero test flip flop 28 changes state. This causes a control signal to be sent to the read up and down counter and display system from the dynamic zero test flip flop to cause the number in the counters of this system to be directly displayed instead of the complement thereof.

Additionally, at clock 19, the number detector 26 operates to provide a round off function for the indication to be subsequently provided by the read up and down counter and display system 24. The number detector senses the output from a counter in the read up and down counter and display system which indicates the first digit behind the decimal point in the output indication, and if such digit is not either a 0, a 5, or some similar predetermined number, the number detector causes the clock control 20 to permit another ramp measuring cycle to begin in the analog to digital measuring unit 22. This additional ramp cycle causes digital output pulses from the analog to digital measuring unit to be fed to the read up and down counter and display system 24, and when these pulses trigger the counter providing the sensed digit to the round off number (i.e., 0 or 5) the number detector permits the clock control to switch to clock 20 terminating the cycle of the analog to digital measuring unit. Thus a rounded number is indicated in the read up and down counter and display system.

During not-zero set operation, the electronic measuring unit 10 may also utilize the zero test unit 30 and automatic zero set unit 36 to accomplish automatic zeroing of the system when no input is present at 44. At the end of clock 19, the zero test unit 30 will sense the indication in the counters provided in the read up and down counter and display system 24, and if this indication is within a given band, plus or minus, from the previous zero set operation, the automatic zero set unit 36 will automatically zero the counter output. This automatic zeroing function is exactly the same as the manual zero set function provided with the switch 42.

The exact manner in which the circuitry of the present invention performs the heretofore described functions will become subsequently apparent by reference to the detailed description of the remaining drawings.

ANALOG TO DIGITAL MEASURING UNIT

The analog to digital measuring unit utilized with the present invention may comprise any one of a number of conventional measuring units which operate to convert an analog electrical signal indicative of the quantity to be measured to a digital output signal which is a function of the input signal. Generally such measuring units include a reference ramp generator which provides a ramp signal for comparison with the input analog signal, and an oscillator generated digital output signal which is time gated in accordance with the input analog signal - ramp signal comparison.

Figure 2:
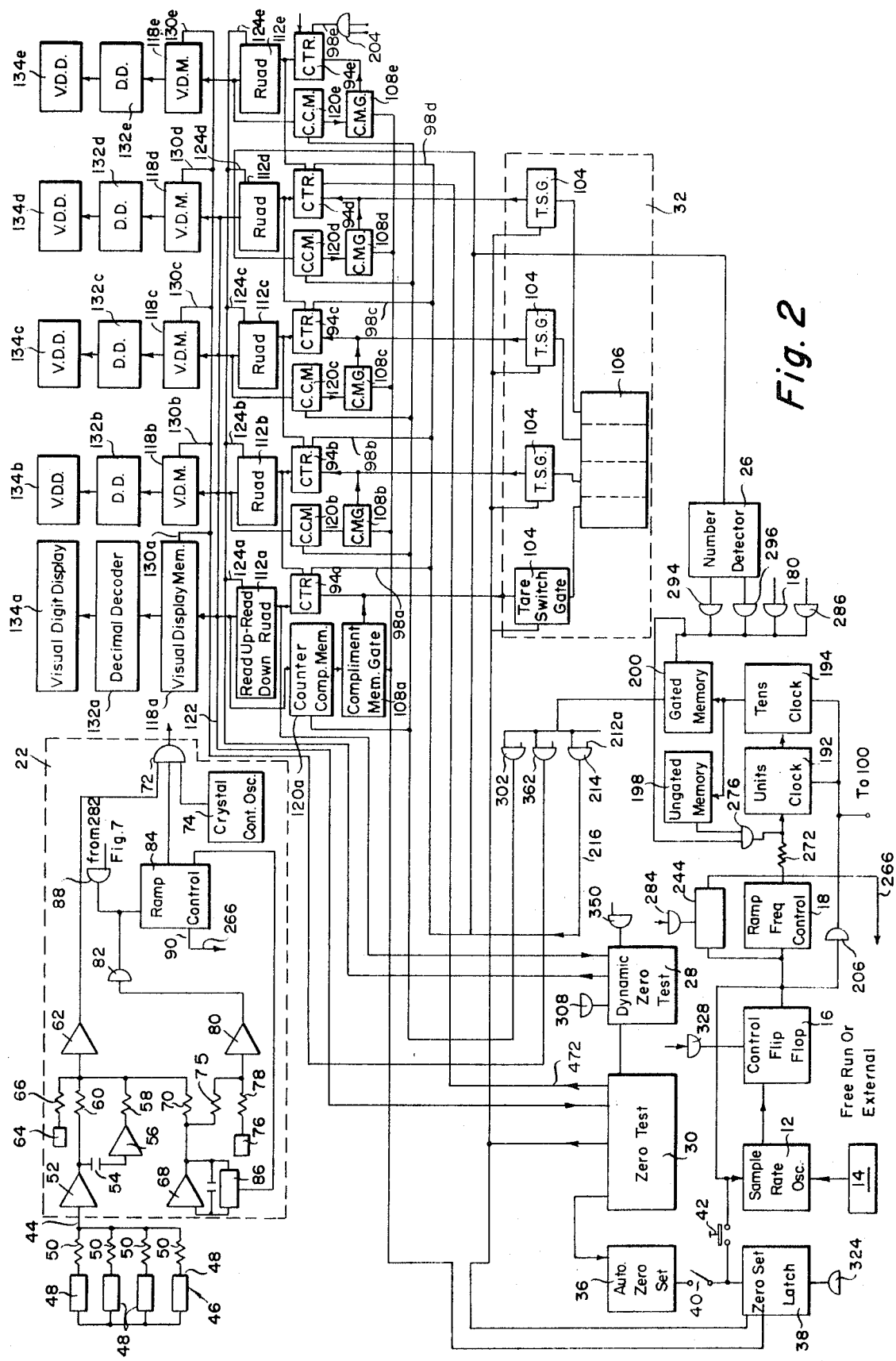
FIG. 2 is a detailed block diagram of the electronic measuring unit of the present invention.

For purposes of illustration in FIG. 2, the analog to digital measuring unit 22 is formed by a dual ramp system described completely in a co-pending application entitled "Measuring and Conversion System", Ser. No. 669,113 assigned to the assignee herein. Briefly, this analog to digital measuring unit employs an analog input signal provided by a sensing unit, transducer, or any similar unit 46 capable of producing an analog signal which is a function of the quantity to be measured. The analog input signal may be provided by a plurality of load cells 48 and is developed across load cell resistors 50 and fed to a D.C. amplifier 52 at the input to the analog to digital measuring unit. Any A.C. component in the analog input signal, is coupled by a coupling capacitor 54 to an A.C. amplifier 56. This A.C. component is often generated by conditions present during the measuring process and normally constitutes an undesirable factor in the analog input signal. For example, in a motion weighing application, the A.C. component can be generated by vibrations in a weigh platform connected to the load cells.

The output of the A.C. amplifier 56 is developed across an output resistor 58 and is inverted relative to the output of the D.C. amplifier 52 which is developed across an output resistor 60. The two output signals are combined with a bias signal at the input of a first detector 62. The A.C. amplifier may constitute an operational amplifier which operates to substantially phase shift the A.C. component of the input signal 180° with respect to the D.C. component thereof, or conventional inversion circuitry known to the art may be employed. The A.C. component, although inverted, is maintained unchanged in magnitude, and therefore the combination of the outputs from the A.C. and D.C. amplifiers algebraically reduce oscillatory forces in the input analog signal.

The first detector 62, which may constitute a zero crossing detector, receives the sum of a negative bias signal which is provided by a bias source 64 across a bias resistor 66, the analog input signal corrected for A.C. variations, and a positive going ramp signal generated by a ramp generator 68 and developed across a first ramp resistor 70. The algebraic sum of the positive going ramp and analog signals and the negative bias signal is applied to the input of the zero crossing detector, and when the algebraic sum of these signals reaches zero due to the linearly changing ramp signal, the zero crossing detector output shifts rapidly to provide a start signal at the input of a count out gate 72. Upon receiving the start signal, the count out gate passes constant frequency pulses from a stable oscillator 74, these pulses being fed from the output of the count out gate to a divide ten counter in the read up and down counter and display system 24 to be subsequently described.

As the linear ramp signal is increasing across the first ramp resistor 70, the ramp generator is also developing a ramp signal across a second ramp resistor 75 in a second comparison circuit. The signal from the second ramp resistor is algebraically compared with a negative bias signal provided by a bias source 76 across a bias resistor 78. When the algebraic sum of the signals at the input of a second zero crossing detector 80 reaches zero, the output potential from the second zero crossing detector changes rapidly in polarity from a negative to a positive value. This rapid change in output potential from the second zero crossing detector is directed to a gate 82, which in turn operates to change the state of a ramp control flip flop circuit 84. When the ramp control flip flop circuit changes state, it operates to terminate the feeding of pulses through the count out gate 72 and also to provide a stop signal to a ramp control switching circuit 86. This switching circuit operates to terminate the action of the ramp generator 68 so that the ramp signal input to the comparison circuits drops to 0, causing both zero crossing detectors 62 and 80 to return to an initial state.

The operational cycle of the analog to digital measuring unit 22 is determined by the ramp control flip flop 84, which is activated upon the occurrence of clock 10 from the clock control 20. Clock 10 causes a gate 88 to change state and permit the ramp control flip flop to accept timing pulses from the ramp frequency control 18 at an input 90. Each timing pulse causes the ramp control flip flop to trigger the ramp control switching circuit 86 to initiate operation of the ramp generator 68. Upon the occurrence of clock 20, the gate 88 changes state to prevent the ramp control flip flop from operating further in response to timing pulses at the input 90.

READ UP AND DOWN COUNTER AND DISPLAY SYSTEM

The read up and down counter and display system 24, in conjunction with the clock control 20 constitutes the heart of the electronic measuring system 10. Therefore, it is advantageous to consider this system and the subsystems associated therewith in detail before embarking upon a detailed study of the remainder of the electronic measuring system.

Figure 3:
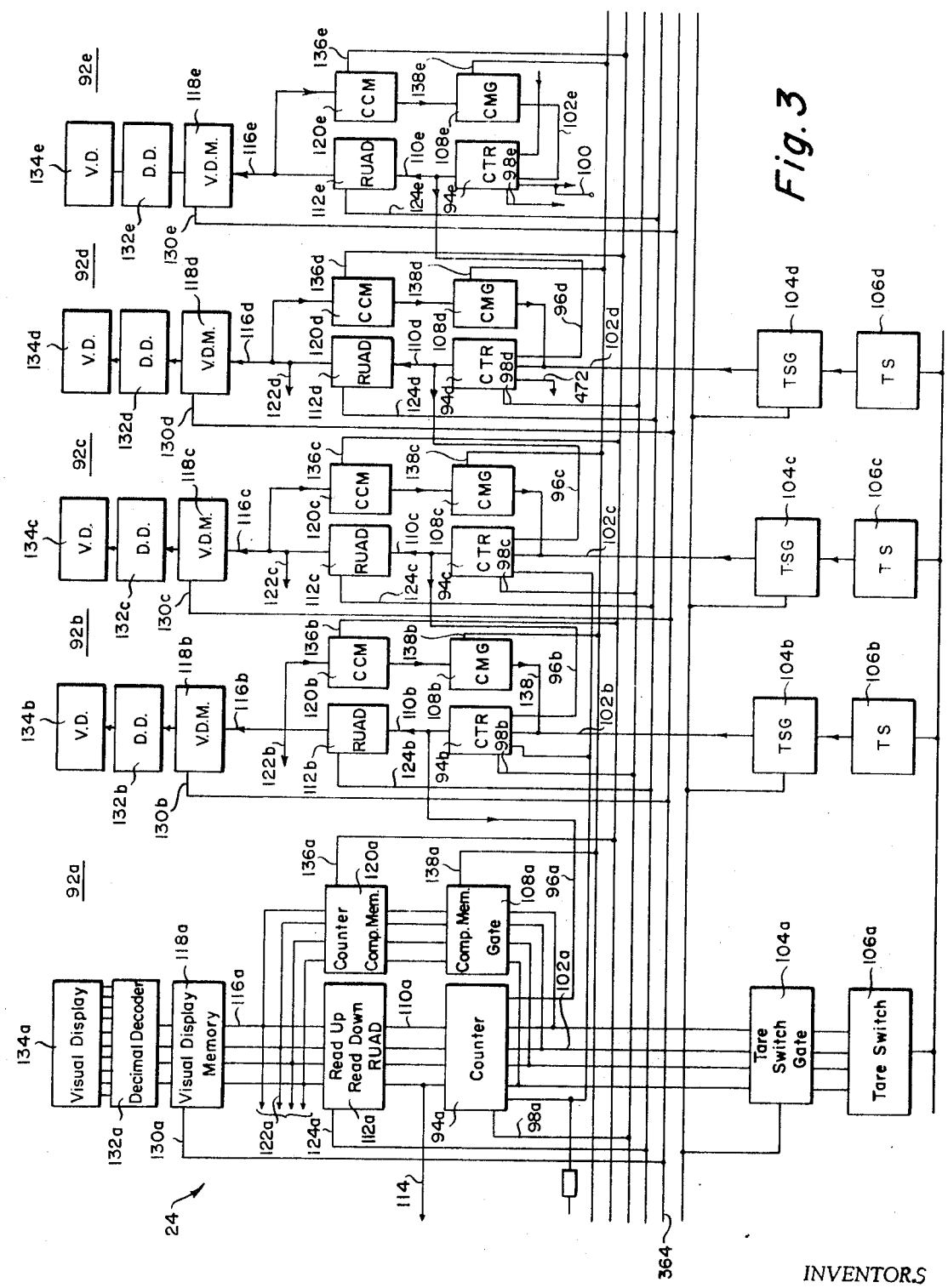
FIG. 3 is a block diagram of the read up and down counter and display unit for the electronic measuring unit of the present invention.
Figure 4:
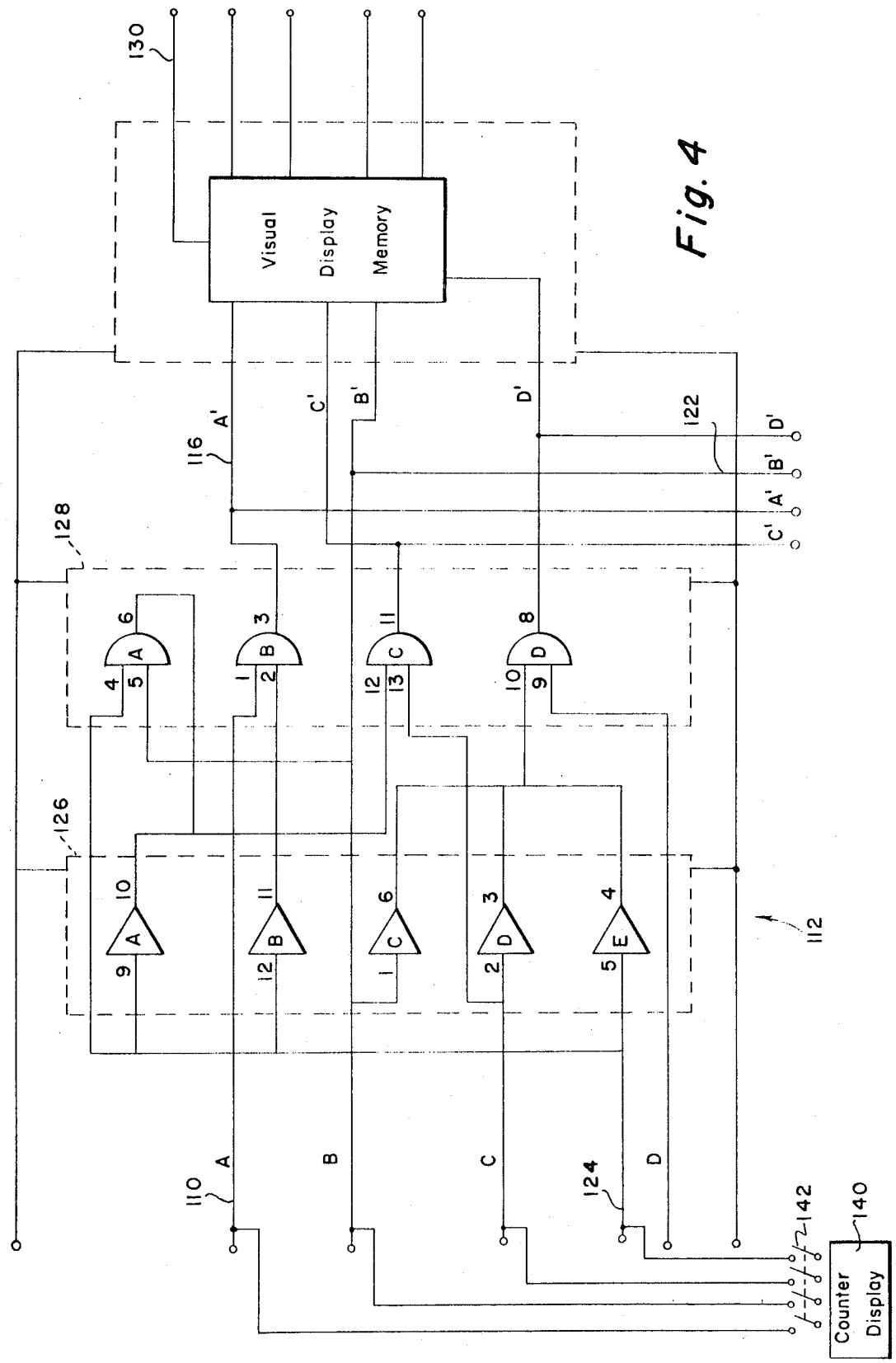
FIG. 4 is a schematic diagram of the RUAD unit for the read up and down counter and display unit of FIG. 3.

Referring now to FIGS. 3, and 4 it will be noted that the read up and down counter and display system 24 includes a plurality of counter and indicator sections 92a, 92b, 92c, 92d and 92e. Each counter and indicator section includes a counter of known type which is adapted to provide a binary output indication in response to a digital pulse input. Thus a divide ten counter 94e receives the digital output from the analog to digital measuring unit, and this output is serially fed through counters 94d, 94c, 94b, and 94a in the various counter sections, which, for purposes of description, will be considered to constitute separate decades. It will be noted that count input lines 96 extend from the output of each counter to the input of the subsequent counter, so that the counters are serially connected.

Each counter and indicator section of the read up and down counter and display system 24 is substantially similar in construction to the remaining sections, and therefore, the section 92d at the far left of FIG. 3, which provides an indication of the most significant digit measured, will be described and shown in detail. It will be recognized, that the description of this section applies to the remaining sections and like reference numerals may be employed. Some differences occur between counter and indicator sections, particularly in the last two decades at the right hand side of FIG. 3 which provide the least significant digits in the output indication. These differences will be subsequently described.

Each counter and indicator section includes, in addition to the count input line, a strobe control line 98 which permits selective strobing of each counter by strobe input signals. It will be noted that the divide ten counter 94e is provided with a separate strobe control line 98e and a reset line 100.

Also, each counter with the exception of the divide ten counter is adapted to receive a four place binary input over four input lines 102 extending from a tare switch gate 104 which is in turn connected to a tare switch 106. Additional binary inputs to each counter may be provided by a complement memory gate 108 connected to the four input lines for each counter. The input lines 102e for the divide ten counter 94e are connected only to the associated complement memory gate 108e.

The output from each counter is provided in the form of a four digit binary number over four outputs 110, individually designated A, B, C, & D, to a read up and down unit (RUAD) 112.

The counters each incorporate direct set inputs 102, and with a strobe signal at "0" on the strobe line 98, the logic level on the inputs 102 will appear on corresponding counter outputs 110. With a "0" reset signal on the reset line 100, the counter outputs 110 will all zero regardless of strobe and clocking of the counter.

The most significant binary digit on the output line D of the counter and indicator section 92a may be sensed by means of a dynamic zero transition line 114 for a purpose to be subsequently described. The section 92a differs in this respect from the remaining sections which provide output indications of lesser significance.

The purpose of each, RUAD unit 112 is to enable the read up and down counter and display system 24 to store initial zero set information, to provide a read out indication of measuring inputs to the electronic measuring system 10 which are of a lesser value than a stored, initial zero set value, and to retain the ability to read out indications which are greater in value than the initial zero set value. Therefore, a four digit binary output is provided from each RUAD unit along output lines 116 individually designated A', B', C' and D' to a visual display memory unit 118 and also to a counter compliment memory unit 120. Additionally, each output from the RUAD unit in a counter and display section may be sampled by four zero test lines 122 connected thereto.

The RUAD unit 112 operates in response to a RUAD control signal provided at a control input 124 thereof, as will be better understood with reference to FIG. 4. The RUAD unit associated with a counter output includes a Hex inverter 126 adapted to provide output signals which are the inverse of the binary input signals provided thereto (OUT equal IN). The inputs to the Hex inverter constitute the outputs on lines A, B, C & D from an individual counter plus the RUAD control input 124. The Hex inverter incorporates inverter sections A, B, C, D, & E for each of these inputs, and the outputs of the Hex inverter are connected to a four circuit Exclusive OR unit 128. The output of this Exclusive OR unit is "1" if one input thereto is "1" and the other "0." It is the outputs from the Exclusive OR unit which form the outputs A', B', C' and D' from the RUAD unit 112 to the visual display memory unit 118 and the counter compliment memory unit 120.

The components of the RUAD unit 112 in FIG. 4 have been provided with pin numbers, and the operation of this RUAD unit will be readily understood by referring to the following truth tables wherein said pin numbers are used for purposes of description:

TRUTH TABLE

| RUAD Control 124 | "0" Reads Complement |
|---|---|
| 124 | "1" Reads Direct |

DIRECT READING 124="1"

| Dec. | LINE A, TO (XOR) B1 | INVERTOR B11 TO (XOR) B2 | (XOR) B3 to A' |
|---|---|---|---|
| 0 | 0 | 0 | 0 |
| 1 | 1 | 0 | 1 |
| 2 | 0 | 0 | 0 |
| 3 | 1 | 0 | 1 |
| 4 | 0 | 0 | 0 |
| 5 | 1 | 0 | 1 |
| 6 | 0 | 0 | 0 |
| 7 | 1 | 0 | 1  A=A' |
| 8 | 0 | 0 | 0 |
| 9 | 1 | 0 | 1 |

B, Direct to B'                                              B=B'

| Dec. | LINE C TO (XOR) C13 | INVERTOR A10 TO (XOR) C12 | (XOR) C11 TO C' |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 1 | 0 | 1 |
| 5 | 1 | 0 | 1  C=C' |
| 6 | 1 | 0 | 1 |
| 7 | 1 | 0 | 1 |
| 8 | 0 | 0 | 0 |
| 9 | 0 | 0 | 0 |

| Dec. | LINE D TO (XOR) D9 | INVERTER E4 (XOR) D10 | (XOR) D8 TO D' |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0  D=D' |
| 6 | 0 | 0 | 0 |
| 7 | 0 | 0 | 0 |
| 8 | 1 | 0 | 1 |
| 9 | 1 | 0 | 1 |

COMPLEMENT READING

| Dec. | LINE A TO (XOR) B1 | INVERTER B11 TO (XOR) B2 | RUAD Control 124="0" (XOR) B3 TO A' |
|---|---|---|---|
| 0 | 0 | 1 | 1 |
| 1 | 1 | 1 | 0 |
| 2 | 0 | 1 | 1 |
| 3 | 1 | 1 | 0 |
| 4 | 0 | 1 | 1 |
| 5 | 1 | 1 | 0 |
| 6 | 0 | 1 | 1  A=A' |
| 7 | 1 | 1 | 0 |
| 8 | 0 | 1 | 1 |
| 9 | 1 | 1 | 0 |

| B, Dec. | Direct to B' line C to (XOR) C13 | (XOR) A4 | (XOR) A5 | B=B' (XOR) A6 (XOR) C12 | (XOR) C11 to C' |
|---|---|---|---|---|---|
| 0 | 0 | 0 | 0 | 0 | 0 |
| 1 | 0 | 0 | 0 | 0 | 0 |
| 2 | 0 | 0 | 1 | 1 | 1 |
| 3 | 0 | 0 | 1 | 1 | 1 |
| 4 | 1 | 0 | 0 | 0 | 1 |
| 5 | 1 | 0 | 0 | 0 | 1 |
| 6 | 1 | 0 | 1 | 1 | 0 |
| 7 | 1 | 0 | 1 | 1 | 0 |
| 8 | 0 | 0 | 0 | 0 | 0 |
| 9 | 0 | 0 | 0 | 0 | 0 |

$C' = C \cdot \bar{B} + B \cdot \bar{C}$

| Dec. | Line D to (XOR) D9 | Line B to inverter C1 | Line C to inverter D2 | (XOR) D10 | (XOR) D8 to D' |
|---|---|---|---|---|---|
| 0 | 0 | 0 | 0 | 1 | 1 |
| 1 | 0 | 0 | 0 | 1 | 1 |
| 2 | 0 | 1 | 0 | 0 | 0 |
| 3 | 0 | 1 | 0 | 0 | 0 |
| 4 | 0 | 0 | 1 | 0 | 0 |
| 5 | 0 | 0 | 1 | 0 | 0  D'= $\overline{B \cdot C \cdot D}$ |
| 6 | 0 | 1 | 1 | 0 | 0 |
| 7 | 0 | 1 | 1 | 0 | 0 |
| 8 | 1 | 0 | 0 | 1 | 0 |
| 9 | 1 | 0 | 0 | 1 | 0 |

Collecting Results for COMPLEMENT

| Dec. IN | INPUT A | B | C | D | OUTPUT A' | B' | C' | D' | Dec. OUT |
|---|---|---|---|---|---|---|---|---|---|
| 0 | 0 | 0 | 0 | 0 | 1 | 0 | 0 | 1 | 9 |
| 1 | 1 | 0 | 0 | 0 | 0 | 0 | 0 | 1 | 8 |
| 2 | 0 | 1 | 0 | 0 | 1 | 1 | 1 | 0 | 7 |
| 3 | 1 | 1 | 0 | 0 | 0 | 1 | 1 | 0 | 6 |
| 4 | 0 | 0 | 1 | 0 | 1 | 0 | 1 | 0 | 5  Output = (9-Input) |
| 5 | 1 | 0 | 1 | 0 | 0 | 0 | 1 | 0 | 4 |
| 6 | 0 | 1 | 1 | 0 | 1 | 1 | 0 | 0 | 3 |
| 7 | 1 | 1 | 1 | 0 | 0 | 1 | 0 | 0 | 2 |
| 8 | 0 | 0 | 0 | 1 | 1 | 0 | 0 | 0 | 1 |
| 9 | 1 | 0 | 0 | 1 | 0 | 0 | 0 | 0 | 0 |

It will be apparent from the above truth tables that the "0" or "1" state of the RUAD control input signal on the RUAD control input line 124 determines whether the binary output signal provided by the RUAD unit 112 constitutes a direct reading of the binary output from the associated counter or an indication of the complement thereof.

The outputs on the output lines A', B', C' and D' for each RUAD unit are directed to the visual display memory unit 118, from which they are gated in response to a gate control pulse on a gate control input line 130 to a suitable decimal decoder 132 of known type. In the decimal decoder, the binary number from the visual display memory unit is decoded and transformed into a corresponding digital signal which is fed to a digital visual display unit 134.

The binary signals on the output lines, A', B', C' and D' are also directed to the counter complement memory unit 120 upon receipt thereby of an enabling signal at an input 136, and are gated from this memory unit in response to a gate control pulse on an input gate line 138 into an associated complement memory gate 108. The complement memory gate passes these information signals, in response to a complement memory gate control pulse on the input gate line 138 therefor to the input of the counter in the respective counter and indicator section.

A counter display unit may be connected to the outputs 110 for the counters 94 to indicate the value stored in the counter complement memories 120. This counter display unit 140 may be selectively connected to the outputs 110 by a switch 142.

CLOCK CONTROL

The clock control 20 provides the control logic for all of the sub systems in the electronic measuring unit 10. As previously described, the toggling rate of the clock control is set by the ramp frequency control 18. Basically, the clock control includes a units clock and a tens clock, the output of which is buffered into two memory units. One memory unit is ungated and follows the clock, while the remaining memory unit may be gated. This gated memory prevents a new input by locking upon itself when the clock reaches a clock 10 count. The lock can be released by rounding the indication in the counters of the read up and down counter and display system 24 upon the occurrence of clock 20 in not zero set operation, while in zero set operation, the release is held.

The operation of the clock control 20 will best be understood by referring to FIGS. 1, 2, 5, 6 and 7. Considering first the operation of the clock control 20 in zero set operation, the cycle is initiated by closing the zero set push button switch 42 to complete a circuit between the control flip flop 16 and a zero set latch 38.

Figure 5:
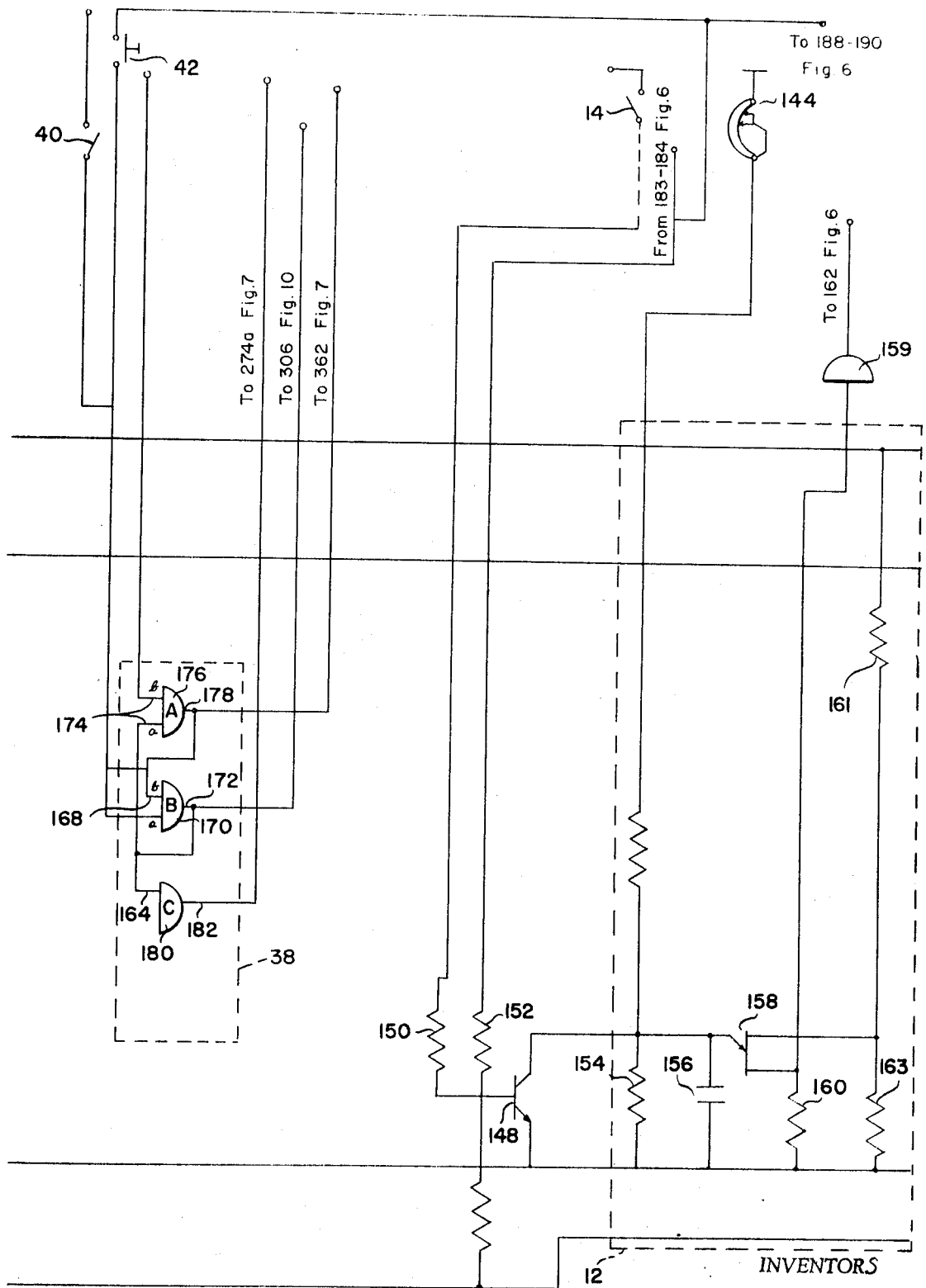
FIG. 5 is a schematic diagram of the zero set latch and sample rate oscillator of FIG. 1.

Power is provided through rheostat 144 and a resistor 146 to the sample rate oscillator 12 (FIG. 5). The sample rate oscillator includes a transistor 148 having a resistor 150 connected between the base electrode thereof and the external control switch 14 and a second resistor 152 connected between the base and the control flip flop 16. A resistor 154 is connected across the collector-emitter electrode circuit of the transistor 148 and in series with the resistor 146. Additionally, a capacitor 156 is connected in parallel across the resistor 154.

The collector electrode of the transistor 148 is connected to the emitter electrode of a unijunction transistor 158, and the base one electrode of the unijunction transistor is connected to an output resistor 160. The base two electrode of the unijunction transistor is connected to a voltage divider circuit consisting of resistors 161 and 163 which fix the base two voltage for the unijunction transistor.

When the control flip flop is in the quiescent state a "0" voltage level is impressed on the zero set switch 42 for a purpose to be subsequently described.

Figure 6:
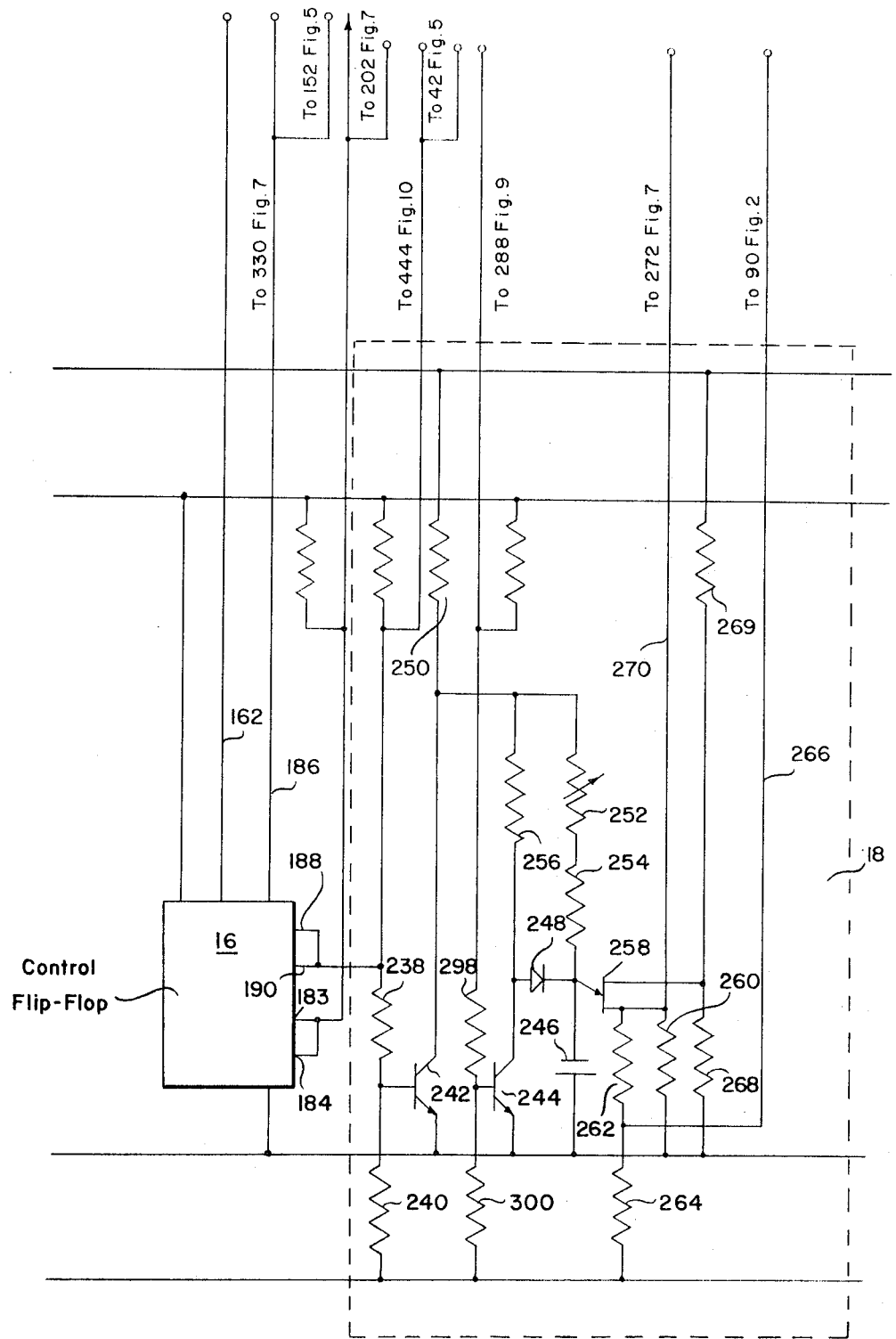
FIG. 6 is a schematic diagram of the ramp frequency control of FIG. 1.

With the transistor 148 nonconducting, the capacitor 156 charges through the resistor 146 and the external rheostat 144 until the capacitor reaches a peak point voltage for the unijunction transistor 158. At this point, the unijunction transistor fires and a positive pulse appears across the output resistor 160. This positive pulse constitutes the input to a gate 159 which in turn provides a negative pulse to the control flip flop 16 which is received at an input 162 for the control flip flop (FIG. 6).

The closure of the zero set switch 42 operates to latch the zero set latch 38 in a zero set condition. The "0" output signal from quiescent control flip flop 16 is connected by the zero set switch to a first input 168a for a gate 170 in the zero set latch circuit (FIG. 5). With a "0" signal level on the input 168a, the output 172 for the gate 170 is "1" and an output 174a for a second gate 176 and 164 for a third gate 180 connected thereto is also "1." The output signal on the output 182 for the gate 180 is a logic "0" while output 178 for the gate 176 is also "0," and this "0" indication is fed to a second input 168b for the gate 170. This interconnection between the gates 170 and 176 operates, in zero set, to lock the outputs 178 and 182 in a "0" condition and the output 172 in a "1" condition. Thus, the zero set latch 38 is locked in a zero set.

The positive pulse at the input 162 to the control flip flop 16 (FIG. 6) causes the control flip flop to change state, and outputs 183 and 184 of the control flip flop, which had previously been "0," now provide a "1" indication. Similarly, outputs 188 and 190 of the control flip flop, which had been in a "1" state, now change to a "0" state.

The "1" signal level from the outputs 183–184 of the control flip flop 16 is fed back to the resistor 152 in the base circuit of the transistor 148 of the sample rate oscillator 12 and furnishes the base voltage signal which drives the transistor into conduction. The conduction of the transistor 148 operates to shunt the capacitor 156, thereby locking the unijunction transistor 158.

Figure 7:
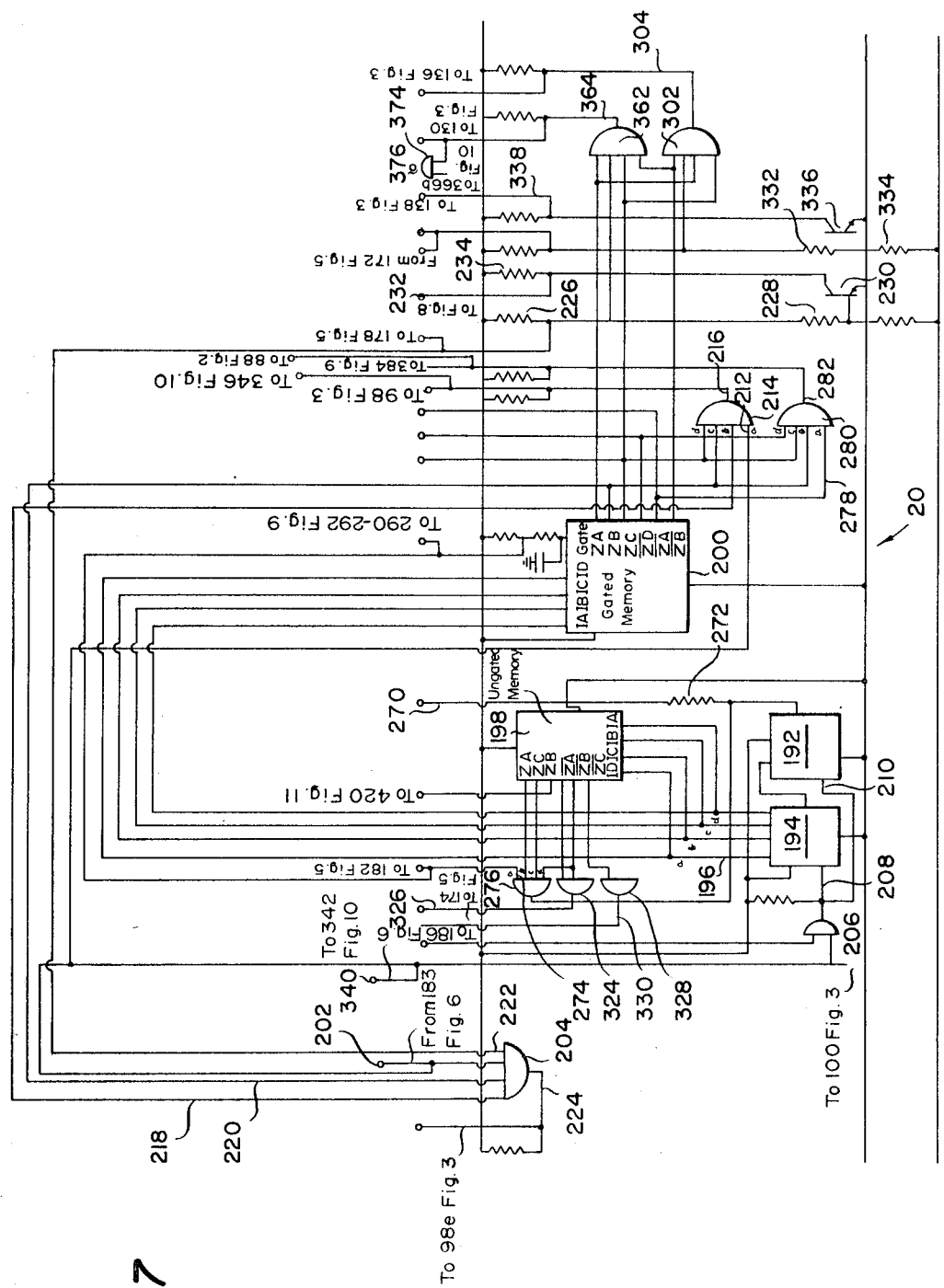
FIG. 7 is a schematic diagram of the clock control of FIG. 1.

The clock control 20, illustrated in detail in FIG. 7, includes a units clock 192 and tens clock 194 connected to register the toggling or clock pulses received from the ramp frequency control 18. The tens clock 194 registers every ten counts of the units clock 192, and four place binary outputs 196 a, b, c and d from the tens clock are connected to an ungated memory unit 198 and a gated memory unit 200. The gated and ungated memories operate in response to clock output signals from the clock 194 to provide the control logic signals for the electronic measuring unit 10.

The "1" signal level from the output 183 of the control flip flop 16 is provided to an input 202 for a gate 204 and also to the input of a reset gate 206. This signal level at the input of the reset gate 206 switches the output state of the reset gate from a "1" to a "0" state, thus removing a previously applied reset signal from the reset inputs 208 and 210 for the units and tens clocks 192 and 194 respectively. Also output 183 similarly removes a reset signal from the reset line 100 to the divide ten counter 94e.

The "1" signal at the input 202 is also directed to an input 212a for a zero-weigh gate 214. The remaining inputs 212b, c, and d to the zero-weigh gate are connected to outputs Za, Zb, and Zc respectively of the gated memory 200 which, at this initial point, are all in a "1" state as there is no count entered in the tens clock 194. Therefore, the logic signal output from the zero-weigh gate 214 at the output 216 thereof is a "0," and this "0" indication is fed to the strobe input lines 98 for the counters 94a–d, (FIG. 3). It will be noted that in zero set operation, the divide ten counter 94e is not strobed, for no tare switch 106 is connected to this counter.

As previously indicated, the input 202 provides a "1" logic signal to the gate 204, and this corresponds to the "1" logic signal levels at inputs 218 and 220 for this gate which are connected to the outputs Za, and Zb of the gated memory 200.

The remaining input 222 to the gate 204 is at a "0" logic level, for this input is connected to the output 178 of the gate 176 in the zero set latch 38 (FIG. 5). Thus, the logic level at the output 224 for the gate 204 is "1" and this "1" signal is fed to the strobe input line 98e for the divide ten counter 94e to preclude strobing of this counter.

Figure 8:
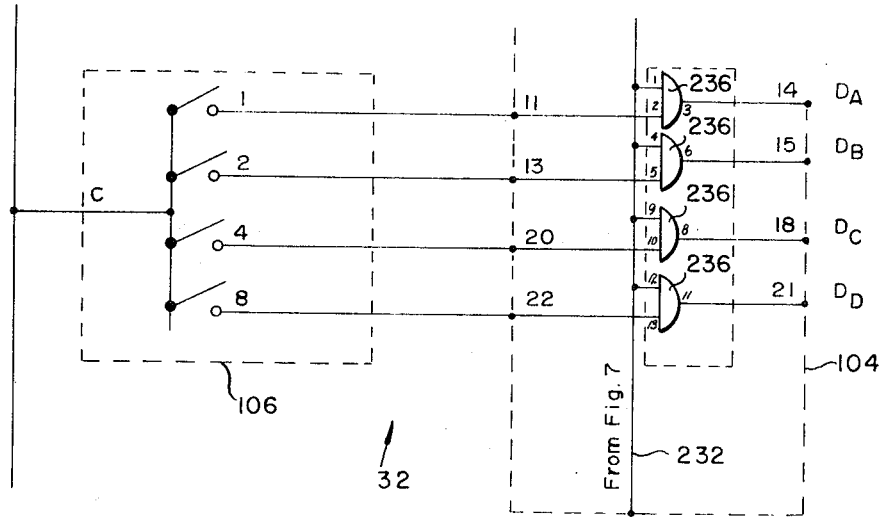
FIG. 8 is a schematic diagram of the tare control of FIG. 1.

In zero set operation, the strobing of the counters 94a, b, c and d will enter into the counters binary information which has been previously set into the tare control 32. The tare control includes tare switches 106 which may be selectively activated to provide a desired binary number and tare switch gates 104 connected to gate binary information from the tare switches to the inputs 110 of the counters. The tare switch and tare switch gate section for one counter is illustrated in FIG. 8.

To control the tare switch gates upon strobing of the associated counters, the "0" logic level at the output 178 of the gate 176 (FIG. 5) is connected between voltage divider resistors 226 and 228 for the base circuit of a transistor 230 (FIG. 7). With a "0" signal at the base of the transistor 230, the transistor is nonconductive and a "1" logic level signal occurs on an output line 232 as a result of the signal developed across a resistor 234. The output line 232 is connected to one input for gates 236 which form the tare switch gate 104 (FIG. 8), and a "1" logic level on line 232 results in the passage of binary information from the tare switches 106 through the gates 236.

To provide changing logic control signals for the purpose of programming the electronic measuring circuit 10 through a cycle of operation, it is necessary for the ramp frequency control 18 to toggle the units and tens clock counters 192 and 194 of the clock control 20. Referring to FIG. 6, it will be noted that the outputs 188 and 190 of the control flip flop 16 are connected by means of a voltage divider including series resistors 238 and 240 to the base of a transistor 242 in the ramp frequency control 18. The "0" logic level at the outputs 188 and 190 applied to the base of the transistor 242 causes the transistor to remain nonconductive, and similarly, a transistor 244 connected to partially shunt the transistor 242 also remains nonconductive. With the transistors 242 and 244 nonconductive, a capacitor 246 connected by a diode 248 across the collector-emitter circuit of the transistor 244 begins to charge. The capacitor charges through a resistor 250 and a parallel path formed by a variable resistor 252 in series with a resistor 254 and a resistor 256 connected to the diode 248.

The emitter electrode of a unijunction transistor 258 is connected to the capacitor 246 and when the charge on the capacitor reaches the peak voltage point for the unijunction transistor, the unijunction fires impressing an output voltage across a resistor 260 connected to the base one of the unijunction. A voltage divider also connected to the base one of the unijunction transistor consists of series resistors 262 and 264 which provide a positive pulse to an output line 266 when the unijunction is conducting. Resistors 268 and 269 connected to the base two electrode for the unijunction transistor 258 set the voltage level on the base two electrode.

The output pulse provided by the voltage divider 262-264 to the output 266 is lower in level than the output pulse developed across the resistor 260 for an output line 270. The output pulses on the line 270 are fed across a resistor 272 to the input of the units clock 192 in FIG. 7. As a reset control signal has been removed from the reset inputs 208 and 210 of the units and tens clocks 192 and 194, each input pulse across the resistor 272 causes the units clock to advance one count.

The capacitor 246 in the ramp frequency control 18 continues to charge and discharge by action of the unijunction transistor 258. Each discharge of the capacitor results in a one count advancement of the units clock 192 and also the provision of a lower level output pulse on the output line 266. This output line is connected to the input 90 of the ramp control flip flop 84 (FIG. 2) but due to the action of the gate 88, the ramp control flip flop is not operative during counts 0–9.

When the units clock 192 is advanced from count 9 to count 10, the output 196d of the tens clock 194 provides a logic "0" signal to an input IA for the gated memory 200 as well as to an input IA for the ungated memory 198. With the input IA to the gated memory 200 at "0," the following conditions exist at the output terminals ZA, ZB, ZC, ZD and $\overline{ZA}$ for the gated memory unit:

ZA = "0" $\overline{ZA}$, ZB, ZC, and ZD equal "1."

Figure 9:
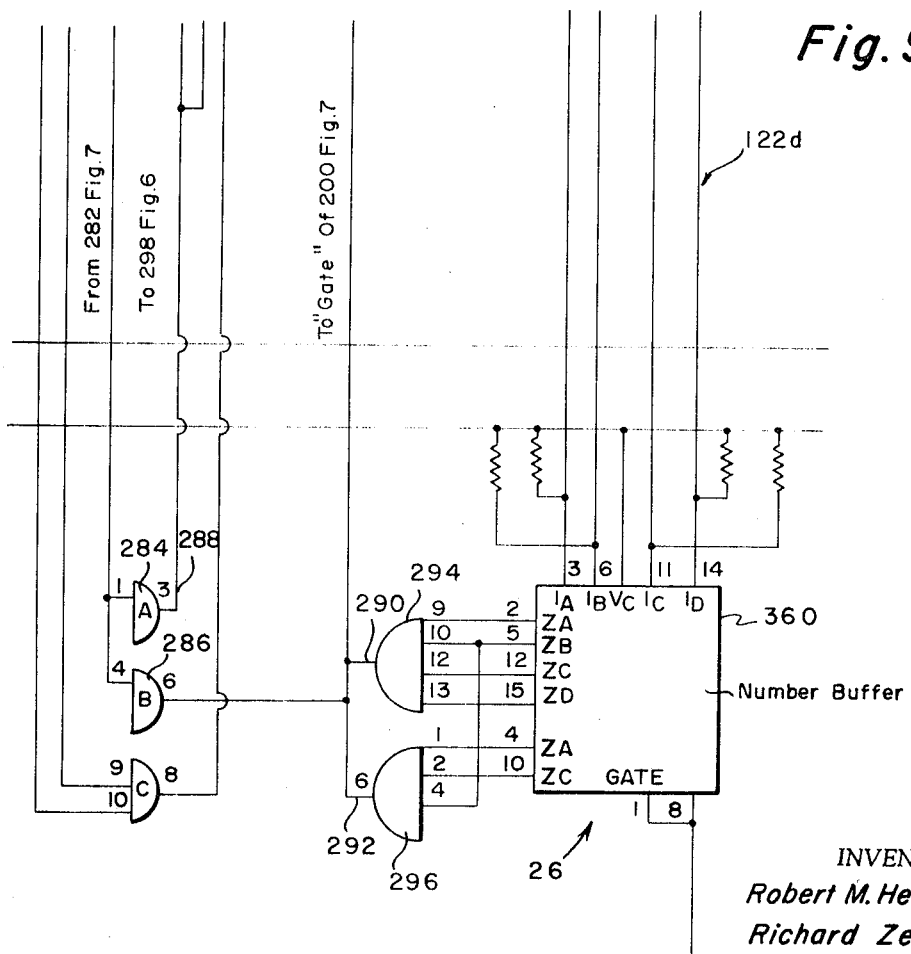
FIG. 9 is a schematic diagram of the number detector of FIG. 1.

At clock count 10, an input 274a to a gate 276 and a gate input for the gated memory 200, both of which are connected to the output 182 of the gate 180 (FIG. 5), are at a "0" logic level. Also, inputs 278a, b, c, and d to a gate 280 from the outputs $\overline{ZA}$, ZB, ZC, and ZD of the gated memory are all at a logic "1" level, thereby causing a "0" signal to be present at the gate output 282. The output at 282 provides an input to gate 88 (FIG. 2) and also to gates 284 and 286 (FIG. 9). The output 288 of gate 284 is now caused to provide a "1" logic signal.

Also, the "0" logic signal from the output 182 of the gate 180 (FIG. 5) is directed to the outputs 290 and 292 of control gates 294 and 296 respectively for the number detector 26.

The "1" logic level signal at the output 288 of the gate 284 is developed across a resistor divider network including resistors 298 and 300 connected to the base of the transistor 244 (FIG. 6). This causes the transistor to conduct and shunt charging current from the capacitor 246 which was flowing across the resistor 256 and the diode 248. The charging rate of the capacitor 246 is now slower due to the current drain across the transistor 244, and this slower charging rate may be adjusted by varying the resistance of the resistor 252. This adjustment is quite important, particularly for weighing applications, for the charging rate of the capacitor and thus the operating rate for the ramp generator 68 can be adjusted, in weighing applications, to match the one-half period of the scale platform natural frequency.

In a single measuring cycle where multiple sequential ramps are generated and a plurality of measurements taken to provide a single measurement indication at the end of the cycle, this means that on the scale platform natural frequency curve, the first ramp may be initiated and the first measurement taken at any point on one excursion of the curve. However, before a measurement is initiated at this same point on a subsequent similar excursion of the curve, an intervening measurement is initiated at substantially the same point on the opposite excursion of the curve.

For example, if the first ramp is initiated at a point on the positive excursion of the scale platform natural frequency curve 30° beyond the beginning of this excursion, the second ramp must occur at a point substantially 30° beyond the beginning of a subsequent negative excursion, which is not necessarily the next successive negative excursion, before a third ramp is initiated at a point 30° beyond the beginning of a subsequent positive excursion. This relationship is maintained for all ramps initiated during a single measuring cycle, and prevails even when a plurality of ramps are initiated at spaced points on a single excursion of the ramp frequency curve.

As previously indicated, the pulse on the output line 270 for the ramp frequency control 18 leads in amplitude the pulse on the output line 266 therefrom, and thus the tens clock 194 is caused to register the count 10 before the ramp timing pulse on the line 266 causes the ramp control flip flop 84 to initiate operation of the ramp generator 68. When the pulse on the line 266 reaches an amplitude sufficient to cause the ramp control flip flop 84 to change state, the gate 88 has already received a "0" logic input from the output 282 of the gate 280 (FIG. 7) to enable operation of the ramp control flip flop.

During clocks 10–19, the ramp control flip flop 84 in the analog to digital measuring unit 22 is sequentially pulsed by the output pulses on line 266, while the units clock 192 is advanced by the output pulses on line 270 in the manner previously described. During ramping by the ramp generator 68 of the analog to digital measuring unit, the capacitor 246 in the ramp frequency control 18 recharges, and the capacitor charging time exceeds the ramp period so that a delay period exists between successive ramps. This action continues through clock 19.

When the units clock 192 (FIG. 7) advances the tens clock 194 to clock 20, the output 196d of the tens clock assumes a "1" logic value and the output 196c assumes a "0" logic value. The logic "1" on the output 196d is fed to the input IA of the gated memory unit 200 while the logic value "0" on the output 196c is fed to the input IB of the gated memory unit. The output ZA of the gated memory unit now becomes a logic "1" while the output ZB becomes a logic "0," thereby causing the output 282 of the gate 280 to pass a logic "1" signal to the inputs of gates 284 and 286 of FIG. 9. The output 288 of the gate 284 now provides a logic "0" signal across the resistors 298 and 300 at the base of transistor of 244 of FIG. 6, and the transistor 244 is rendered nonconductive. Thus, the capacitor 246 resumes charging at a fast rate through the resistor 256 and diode 248, to provide rapid toggling pulses to the units clock 192. Also, the change in state at the output 282 of the gate 280 causes the gate 88 to terminate operation of the ramp control flip flop 84, and the ramp control flip flop is no longer responsive to pulses on the output line 266.

In clock 20, with the outputs ZA, $\overline{ZB}$, and ZC of the gated memory unit 200 all logic "1," and 172 FIG. 5 "1," a gate 302 connected to the gated memory unit will have a "0" signal on an output line 304 therefor (FIG. 7). The line 304 is connected to the inputs 136 a–e for the counter complement memories 120 a–e and provides a gating signal to these inputs so that the counter complement memory units can receive the outputs from the associated RUAD units 112.

Figure 10:
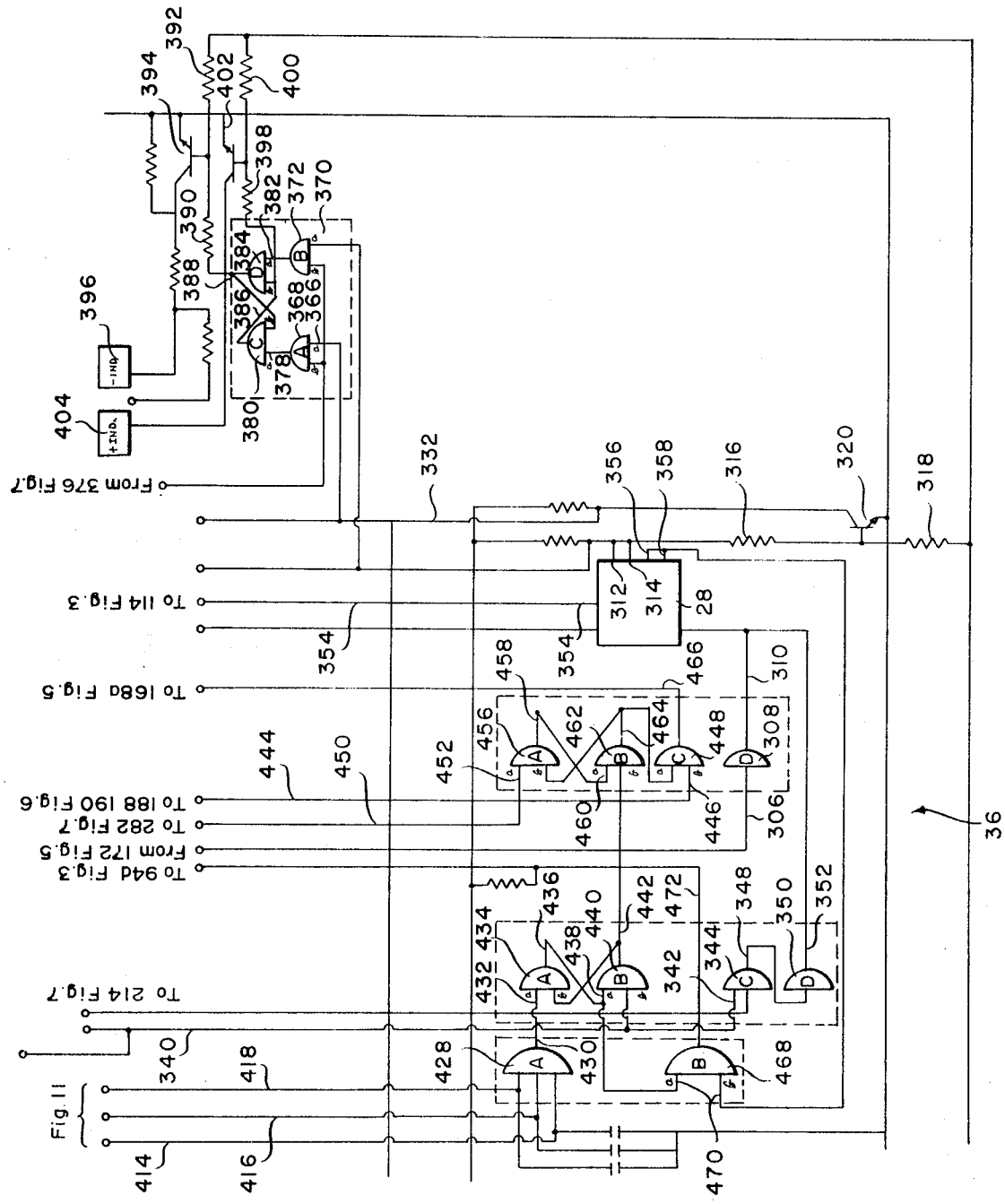
FIG. 10 is a schematic diagram of the automatic zero set unit of FIG. 1.

At the time of the application of the gating signal to the counter complement memory units 120, the logic "1" output level on the output line 172 for the gate 170 in the zero set latch 38 (FIG. 5) is present at the input 306 of a gate 308 (FIG. 10). Thus the output of the gate 308 on an output line 310 therefor is at a logic "0" and this logic signal is fed to the input of the dynamic zero test flip flop 28. The logic "0" on the input of the dynamic zero test flip flop causes a logic "1" to appear at flip flop outputs 312 and 314, and this output signal across base resistors 316 and 318 for a transistor 320 causes the transistor to conduct. With the transistor conducting, a "0" logic signal will appear on an output 322 connected thereto and the logic signal on this output line is fed to the control inputs 124 a–e for the RUAD units 112. As previously described, a "0" logic signal at the RUAD control inputs causes the RUAD units to provide an output to the associated counter complement memory 120 which is the complement of the input signal to the RUAD unit. As the counter complement memory has been gated, this complement number will be entered in the counter complement memory.

The units clock 192 (FIG. 7) is clocked at a rapid rate after clock 20, and when the tens clock 194 is triggered by the units clock to register clock 30, the gated memory unit 200 causes the output from the gate 302 to shift from a logic "0" to a logic "1." Thus the gating signal is removed from the counter complement memory.

Also, upon registration of clock 30, the tens clock 194 causes the outputs $\overline{ZA}$ and $\overline{ZB}$ of the ungated memory unit 198 to register a logic "1," and this logic signal at the input of a gate 324, causes a logic "0" to occur on an output line 326 for the gate. The line 326 is connected to the input 174b for the gate 176 in the zero set latch 38 (FIG. 5), and a "0" at the input 174b causes the output on the line 178 to shift from a logic "0" to a logic "1." The logic "1" appears at the input 168b for the gate 170, and causes the output of this gate on the line 172 to shift from logic "1" to logic "0." As the zero set push button 42 is now open, the output 178 of the gate 176 is latched at a logic "1" while the output 172 of the gate 170 is latched at a logic "0."

The units clock 192 continues to advance, and when the units clock triggers the tens clock 194 from the 39 count to the 40 count registration, the ungated memory unit 198 (FIG. 7) is caused to provide a logic "1" input to a gate 328, the output 330 of which now registers a logic "0." This "0" signal on the output 330 is fed to the input 186 for the control flip flop 16 (FIG. 6) causing the outputs 183 and 184 for the control flip flop to shift to a logic "0" while the outputs 188 and 190 shift to a logic "1." Thus, the "0" logic level output on the line 183 removes the drive from the base of the transistor 148 (FIG. 5) and the transistor becomes nonconductive permitting the capacitor 156 to charge for another cycle in the free run mode.

As the output 183 of the control flip flop 16 has been shifted, the logic "0" level therefrom at the input 202 is present at the input to gate 206, and the output of this gate changes to a logic "1" to provide a reset signal to the reset inputs 208 and 210 for the tens clock 194 and units clock 192 respectively. Also, the output signal from output 183 is provided to the reset input for the divide ten clock 94e.

Finally, the "0" logic signal at the input 202 also appears at the input 212a for the gate 214, causing a logic "1" to appear at the output 216 for the gate. Also, with the outputs 188 and 190 of the control flip flop 16 at a logic "1" the transistor 242 is turned on and the capacitor 246 in the ramp frequency control 18 is shunted and cannot charge. Thus the zero set cycle of the electronic measuring unit 10 in zero set operation has been completed.

TARE OPERATION

For tare operation of the electronic measuring unit 10, the tare switches 106a–d are activated to select a predetermined binary coded decimal number. For example, an open switch might provide a binary "0" while a closed switch provides a binary "1." Then the normal zero set operation is initiated.

Between clocks 0 and 9, the tare gate 104 is operated in the manner previously described to feed the numbers set into the tare switches 106 to the associated counter. The tare gate inverts the numbers provided to the counter inputs to agree with counter logic.

The mathematical operation of the electronic measuring unit 10 during zero set operation with a value of 045.0 set in the tare switches 106 may be understood by referring to the following table:

ZERO SET Operation (Assume Tare Switch set at 045.0)

| Clock | Operation | Counter | RUAD | Out Display |
|---|---|---|---|---|
| 00–09 | Set Tare in Counters | 04500 | 95499 | —·— |
| 10–19 | 10 Ramps (assume 300 counts Ramp) = 3000 counts. At end of Clock 19 | 07500 | 92499 | —·— |
| 20–29 | RUAD Complements in ZERO SET RUAD output to Counter Complement Memory | 07500 | 92499 | —·— |
| 30–39 | Zero Set Latch reset | | | |
| 40 | System returned to Quiescent state. | | | |

NOT ZERO SET OPERATION

In not zero set operation, many of the basic logic and control functions of the electronic measuring unit 10 are identical to those occurring in connection with the operation of the measuring unit in zero set operation. Therefore, a description of these functions will not be repeated in detail in connection with the not zero set operation of the unit.

When the external control switch 14 initiates a not zero set measuring cycle, the zero set push button 42 is open, and therefore the output signal on the output 172 of the gate 170 remains latched at "0," while the output signal on the output 178 of the gate 176 remains latched at "1" (FIG. 5). This is the same condition which prevailed with the zero set push button open at the end of the zero set operation.

The logic "0" output on the line 172 is developed across base resistors 332 and 334 connected to the base of a transistor 336, (FIG. 7) and the transistor is thereby rendered nonconductive. With the transistor 336 off, a logic "1" signal appears on an output line 338 connected to the collector electrode of the transistor, and this output signal is connected as a gating signal to the input gate lines 138a—e of the complement memory gates 108 (FIG. 3). This gating signal causes the complement memory gates to connect the binary signal stored in an associated counter complement memory 120 to the respective inputs 102 of the counters 94. The complement memory gates like the tare gate 104, constitute inverting gates which invert the input thereto.

Closure of the external control switch 14 triggers the sample rate oscillator 12, causing the control flip flop 16 to change state and lock the sample rate oscillator as previously described. The control flip flop causes the reset signal to be removed from the units clock 192, the tens clock 194 and the divide ten counter 94e. Also, the change of state of the control flip flop results in a signal at the input 202 which causes the gate 214 to provide a logic "0" output signal on the line 216 to the strobe control lines 98a–98d for the counters 94a–94d. The electronic measuring unit 10 operates in the not zero set mode to strobe these counters the same way as occurred in zero set mode. However, in zero set operation, a binary number preset into the tare switches 106 is strobed into the counters 94, while in not zero set operation, the binary number stored in the counter complement memories 120 is strobed into the counters.

In not zero set operation, the divide ten counter 94e is also strobed. This is accomplished by "1" on the line 178 (FIG. 5) in not zero set operation. This "1" logic signal is fed to the input 222 for the gate 204 (FIG. 7). The remaining inputs 202, 218 and 220 to this gate remain at a logic "1" level as they were during zero set operation, and therefore during not zero set operation, the signal at the output 224 of the gate is at a logic "0." This output signal is fed to the strobe line 98e for the divide ten counter, and the binary number in the counter complement memory for the divide ten counter is strobed into this counter when the remaining counters are strobed.

The ramp frequency control 18 continues to pulse the units clock 192 until the transition from the 9 to the 10 clock count occurs. Upon registration of the 10 count in the tens clock 194, the pulse rate from the ramp frequency control 18 decreases and ramping in the analog to digital measuring unit 22 is initiated in the same manner as previously occurred in connection with the zero set operation. However, the "gate" input for the gated memory 200 is not held at "0" by a signal from the output 182 of the gate 180 (FIG. 5) as occurred during zero set operation. The inputs to the gates 284 and 286 (FIG. 9) receive a logic "0" signal from the output 282 of the gate 280 (FIG. 7) in the same manner as occurred during zero set operation. The output 288 of the gate 284 provides a logic "1" signal as does the output of the gate 286. This logic "1" signal from the output of the gate 286 is fed to the "gate" input of the gated memory 200, and is maintained so long as the outputs 290 and 292 of the gates 294 and 296 are not driven to "0."

From clock 10–19, the analog to digital measuring unit 22 operates in the manner described in connection with the zero set operation to enter a measurement indication in the counters of the read up and down counter and display system 24. During clocks 10–39, the most significant digit entered in the counter 94a is sensed. To accomplish this sensing, the "1" signal at the input 202 (FIG. 7) is fed by an output 340 to the input 342 of a gate 344 (FIG. 10). A second input 346 for the gate 344 receives a logic "1" from the output 216 of the gate 214 (FIG. 7). An output line 348 from the gate 344 connects a "0" logic signal which occurs upon the application of "1" inputs to this gate to the input of a gate 350, while an output line 352 from this gate is connected to an input for the dynamic zero test flip flop 28. A logic "1" signal is now present at the output of the gate 350, and is connected to the dynamic zero test flip flop.

An input 354 to the dynamic zero test flip flop is connected to the dynamic zero transition line 114 (FIG. 3). For instance, if the most significant digit from the counter 94a is "9" at clock 10, the output on the dynamic zero transition line 114 is a "1." at the end of clock 20, if no transition has occurred and the most significant digit from the counter 94a is still "9," a "1" signal is still present on the dynamic zero transition line and at the input 354 to the dynamic zero transition flip flop. With no transition occurring in the most significant digit between clocks 10 and 20, the outputs 312 and 314 of the dynamic zero transition flip flop remain at logic "1" while outputs 356 and 358 of the dynamic zero transition flip flop remain at logic "0." Since the dynamic zero test flip flop did not change state, the transistor 320 continues to conduct and the output 322 therefrom provides a "0" logic signal to the RUAD control inputs 124a–e. Thus the RUAD units 112a–e provide an output which is the complement of the binary number output from the counters associated therewith.

In some instances, a transition in the most significant digit will occur between clocks 10 and 20. For example, at clock 10 the most significant digit in the counter 94a may be a "9," thereby providing a logic "1" to the input 354 of the dynamic zero test flip flop 28. However, between clocks 10 and 20, if a transition of the most significant digit occurs, a "0" is registered in the counter 94a of a "0" logic signal will be provided to the input 354 of the dynamic zero test flip flop. In response to this condition, the dynamic zero test flip flop will change state, and outputs 356 and 358 will carry a logic "1" signal while outputs 312 and 314 will carry a logic "0" signal. The "0" signal from outputs 312 and 314 developed across the resistors 316 and 318 will cause the transistor 320 to cease conduction, and a "1" logic signal will be carried by the output line 322 to the RUAD control inputs 124a–e for the RUAD units. The RUAD units 112a–e will now pass binary number indications directly from the counters 94a–e to the visual display memory units 118a–e rather than the complements thereof.

The sensed transition of the most significant digit need not be a transition between "0" and "9," but a transition between any two numbers can be sensed. Also a transition between numbers such as "0" and "9" can be sensed by starting with an intermediate number such as "6" rather than "9."

In not zero set operation, the number detector 26 also operates. The number detector input is taken from the lines 122d at the output of the RUAD 112d in FIG. 3, and the number sensed by the number detector will constitute the second from the right digit in the binary number output provided by the RUAD units. Obviously, any desired digit could be chosen as the input to the number detector, and generally the number detector will be connected to the RUAD unit providing the first digit behind the decimal point in the output indication.

If, at the end of clock 19, the output from counter 94d causes a 0 digit to be provided at the output of the RUAD 112d, then the output lines 122d to the inputs of a number detector buffer memory 360 will all carry a logic "0" indication. The outputs $\overline{ZA}$, $\overline{ZB}$, $\overline{ZC}$, and $\overline{ZD}$ of the number detector buffer memory will all provide a "1" signal to the inputs of the gates 294 and 296, and the outputs 290 and 292 of these gates will provide a "0" signal to the "gate" input of the gated memory unit 200 (FIG. 7). Thus, the gated memory unit is able to operate in a normal manner when the units clock 192 advances the tens clock 194 to clock 20. This normal change can occur if the number detector 26 sensed a round number at the end of clock 19 and provided a "0" signal to the "gate" input of the gated memory unit.

Referring again to FIG. 9, assume that at the end of clock 19, the number detector 26 senses a number other than a round number; for example a binary "3." In this case, the inputs to the number detector buffer memory 360 from the line 122d could not all be "0." Instead inputs IA and IB would be "1" and inputs IC and ID would be "0." Therefore, the gates 294 and 296 would not have all "1" signal inputs at the end of clock 19, and the outputs 290 and 292 of these gates will provide a "1" signal to the "gate" input of the gated memory 200 (FIG. 7). As the units clock 192 advances the tens clock 194 to clock 20, the outputs 196a, b, and d of the tens clock normally provide a "1" signal and a "0" signal to the input IB respectively of the gates memory unit 200. However, with an undesired number being sensed by the number detector 26 and a "1" input signal at the "gate" input of the gated memory unit, the gated memory unit is not permitted to accept the "1" and "0" signals at the inputs IA and IB thereof. It will be recalled that upon the occurrence of clock 20, the input signals at the inputs IA and IB of the gated memory unit normally cause the outputs ZA and ZB thereof to switch the gate 280 so that a "1" output signal appears on the output 282. This output signal is directed to the ramp frequency control 18 to initiate a decrease in the frequency of the clock pulses and is also directed to the gate 88 to cause the ramp control flip flop 84 to terminate ramping operations in the analog to digital measuring unit 22. However, as these operations cannot occur when the number detector 26 senses an undesired number at the end of clock 19, the input 90 of the ramp control flip flop receives another control pulse and a new ramp initiated after clock 20 is registered by the tens clock 194. Thus the analog to digital measuring unit 22 feeds pulses to the read up and down counter and display system 24 after clock 20, and these pulses are entered as counts in the counters of this system. When the changing binary number indication at the RUAD output of the RUAD unit 112d reaches a desired number (0 or 5 in this case) during this additional ramping period, the number is sensed by the number detector buffer memory 360. The number detector buffer memory operates in response to this number to cause the gates 294 and 296 to send a "0" logic signal to the "gate" input of the gated memory unit 200. The logic signals at the inputs IA and IB of the gated memory unit are not entered to terminate the ramping operation in the normal manner previously described, and the ramp frequency control 18 reinitiates the higher frequency clock signal.

In not zero set operation, after clock 20 has occurred and the "0" signal input is applied to the gate of the gated memory unit 200, the outputs ZA, ZC, and $\overline{ZB}$ are all "1." These outputs provide the input signals for a gate 362, thereby causing a "0" output signal to appear at an output 364 for the gate. This "0" output is coupled by the line 364 for the gate. This "0" output is coupled by the line 364 to the gate control lines 130a–e for the visual display memory units 118a–e (FIG. 3), and operates as a gate signal for the visual display memory units. Thus the numbers are entered in the visual display memory units from the associated RUAD units and sent to the decimal decoders 132a–e and displayed in the visual display units 134a–e.

It is important to indicate whether the numbers displayed in the visual display units 134 are positive or negative, for the number initially entered into the counters 94 from the counter complement memory units 120 could be greater than the numbers subsequently entered into the counters as a result of the measuring operation accomplished by the analog to digital measuring unit 22. To provide this plus or minus indication, the logic signal on the output line 322 to the RUAD control inputs 124a–e is sensed. When the complement of the number entered in the counters 94a–e is to be provided by the RUAD units 112a–e, the outputs 356 and 358 of the dynamic zero test flip flop 28 will carry a "0" signal while the outputs 312 and 314 will carry a "1" signal (FIG. 10). Thus the transistor 320 is rendered conductive, and a "0" logic control signal is sent along the line 322 to the RUAD units. This "0" RUAD control signal is also directed to one input 366a of a gate 368, while the "1" signal from the outputs 312 and 314 is fed to an input 370a for a gate 372. Also, the "0" output signal from the gate 362 on the line 364 (FIG. 7) which provides the gate signal to the gate control lines 130 for the visual display memory units 118 is coupled to the input of a gate 374. A "1" output signal will appear on the output line 376 for the gate 374, and this signal is fed to the inputs 366b and 370b for the gates 368 and 372 (FIG. 10). Thus the input 366a to the gate 368 is "0" while the input 366b is "1" and the output of the gate to the input 378a of a gate 380 will be "1." Simultaneously, the inputs 370a and b to the gate 372 are "1," and therefore the output of the gate 372 to an input 382a of a gate 384 will be "0." An output 386 for the gate 380 is connected to the input 382b for the gate 384, while an output 388 for the gate 384 is connected to the input 378b for the gate 380. With the input signals indicated, a "0" signal will appear on the output 386 while a "1" output signal will appear on the output 388 and thus the gates 380 and 384 are latched. The "1" output on the line 388 is connected across series resistors 390 and 392 which are in turn connected to the base of a transistor 394. A "1" signal on the base of the transistor causes the transistor to conduct, thereby switching on a minus indicator 396. This minus indicator may constitute a lamp or other known indicating means which is activated by the conduction of a switching transistor.

When the RUAD units 112a–e provide an output which is the binary number directly entered in the associated counters 94a–e rather than the complement thereof, the outputs 356 and 358 of the dynamic zero test flip flop 28 will be "1" while the outputs 312 and 314 thereof will be "0." This will result in a "0" input signal at the input 370a for the gate 372, and a "1" signal from the line 322 will appear at the input 366a of the gate 368. The inputs 366b for the gate 368 and 370b for the gate 372 will still receive a "1" input from the output 376 of the gate 374 (FIG. 7). In response to these inputs, the output of the gate 368 will provide a "0" input to the input 378a of the gate 380, while the output of the gate 372 will provide a "1" input to the input 382a of the gate 384. A "1" output will appear at the output 386 of the gate 380 while a "0" output will appear at the output 388 for the gate 384. Thus the transistor 394 will be rendered non-conductive and the minus indicator 396 will not operate. On the other hand, the "1" output at 386 is connected to resistors 398 and 400 in the base circuit of a transistor 402. This transistor is rendered conductive by a "1" signal at the base thereof, and operates to activate a plus indicator 404 in the same manner that the transistor 394 activated the minus indicator 396. This plus indicator may also constitute a signal light or similar indicator device.

When the units clock 192 (FIG. 7) toggles the tens clock 194 to clock 30, the output ZA of the gated memory unit 200 becomes "0" causing the output from the gate 362 on the line 364 to shift from "0" to "1." This "1" signal to the gate control lines 130a–e of the visual display memory units 118a–e (FIG. 3) prevents the passage of further output indications from the RUAD units 112 to the visual display units 134, and the indications previously fed to the visual display units are locked therein.

From clock 30 through clock 40 in not zero set operation, the electronic measuring unit 10 operates in a manner identical to that previously described in connection with the zero set operation.

AUTOMATIC ZERO CONTROL

The automatic zero set circuit 36 is designed to operate with the zero test unit 30 to initiate a zero set cycle during not zero set operation of the electronic measuring unit 10, if the contents of the counters 94 are within a given band, plus or minus from zero at the end of clock 19. Also with the contents of the counters within the same or a different given band sensed by the zero test unit, the zero set circuit will operate to zero the counters.

Assume, for example, that the binary number 92499 is stored in the counter complement memory 120, and at the end of clock 19 in not zero set operation, the counter units 94 have registered 99960. As the most significant digit of the number registered in the counters has not made a dynamic zero transition from "9" to "0," the RUAD units will provide a complement number 00039 which, in clock 20, is rounded by the action of the number detector 26 to 0009. The automatic zero set unit and zero test unit 30 operate in response to the digits at the outputs of the RUAD units 112 after clock 20.

Referring to FIGS. 3, 4, 10 and 11, it will be noted that the zero test unit 30 is connected to the zero test output lines 122 at the outputs of the RUAD units 112a–d. As will become apparent from FIGS. 4 and 11, the zero test unit is composed of a plurality of individual inverters 406 which form inverter sections 408, 410, and 412. Each individual inverter section has a single output line connected to receive the outputs from all of the inverters composing such inverter section, and these output lines are indicated at 414, 416, and 418. The inputs for each inverter section constitute the individual inputs for each inverter 406, and therefore, the inverter sections have a plurality of inputs.

The inputs to the inverter sections 408 and 410 are taken from the zero test lines 122a, 122b, and 122c. Each of these zero test lines comprises a group of four lines A', B', C' and D', as illustrated in FIG. 4. The inputs to the inverter section 408 are formed by the zero test lines 122a (A'–D') and 122b (A' and B'), while the inputs to inverter section 410 are formed by zero test lines 122b, (C' and D') and 122c (A'–D'). The inputs to the inverter section 412 are provided from a variety of sources, two of such input lines constituting the C' and D' lines of the zero test lines 122d. A third input line 420 for this inverter section is connected to the terminal ZB of the ungated memory unit 198 (FIG. 7), while a fourth input 422 is connected to receive the signal on the line output 172 for the gate 170 (FIG. 5). The remaining input lines 424 and 426 are connected to a "common" line.

As the three left hand digits present at the outputs of the RUAD units 112a, 112b and 112c (FIG. 3) are all "0," the outputs on the zero test lines 122a, 122b, and 122c are all zero, and therefore "0" input signals are provided to the inputs of all of the inverters 406 in the inverter sections 408 and 410. Thus, a "1" output signal will be present on the output lines 414 and 416 for these inverter sections.

At clock 20, in not zero set operation the input line 422 will carry a "0" input signal from the output line 172 of the gate 170 while the input line 420 will carry a "0" signal from the output ZB of the ungated memory 198.

As the digit at the output of the RUAD unit 112b is a binary "3" the input lines C' and D' from the zero test lines 122d will also provide a "0" input to the inverter section 412. Thus the output of this inverter section on the output line 418 is a "1."

Referring now to FIG. 10, it will be noted that the output lines 414, 416 and 418 from the zero test unit 30 are connected to the inputs of a gate 428. As the signals on these output lines are all "1" the output signal from the gate on a line 430 will be a "0," and this "0" signal is provided to an input 432a for a gate 434. The gate 434 provides a "1" output signal on an output line 436 which is coupled to an input 438a for a gate 440. A second input line 438b receives "1" input signal present on the line 340, and the output signal from the gate 440 on a line 442 is a "0." The output line 442 is coupled to an input 432b for the gate 434, and thus the output of the gate 434 is latched at "1" while the output of the gate 440 is latched at "0."

During clocks 10–19, an input line 444 provides a "0" input signal to an input 446b for a gate 448 from the outputs 188–190 of the control flip flop 16. Also, an input line 450 provides a "0" input signal to an input 452a for a gate 456 from the line 282 of the gate 280 (FIG. 7). Therefore, output line 458 from the gate 456 is "1" and this output is coupled into an input 460a for a gate 462. An output line 464 from the gate 462 is connected to both an input 446a for the gate 448 and an input 452b for the gate 456. Thus, during clocks 10–19, the output signal from the gate 456 is "1."

The "0" output on the line 442 from the gate 440 is directed to an input 460b for the gate 462, and this "0" input reverses the previously existing latch to provide a "1" signal on the output line 464 and a "0" signal on the line 458 after clock 19. Thus the output from the gate 448 on a line 466 will become a "0." The line 466 is coupled to the input 168a for the gate 170 in the zero set latch 38, (FIG. 5) and the zero set latch is caused to operate in the same manner as would occur in response to the closing of the manual zero set button 42. A normal zero set operation results automatically in response to the "0" signal on the line 466.

The physical zeroing of the counter 94d is caused by the number detector when no transition of the most significant digit occurs between clocks 10 and 20. However, should such transition occur, counter zeroing is brought about by the action of a reset gate 468 (FIG. 10). The "1" output signal from the gate 434 is connected to an input 470a of the gate 468, while an input 470b of the reset gate receives a "1" signal from the dynamic zero test flip-flop 28. With both inputs at logic "1," the reset gate will provide a "0" output on a line 472 which is connected to a reset terminal for the counter 94d (FIG. 3). When no transition of the most significant digit is sensed by the dynamic zero test flip-flop, a "0" signal will be provided to the input 470b to render the reset gate inoperative.

The response of this automatic zero circuitry may be varied by altering the number of bits tested at the output of the RUAD unit 112d. It is obvious that in not zero set operation, this automatic zeroing operation occurs only when the outputs of the RUAD units 112a, 112b, and 112c are all 0.

The automatic zeroing of the counter 94d and the initiation of an automatic zero set operation has been described as a single operation resulting when the contents of the counters 94 fall within a given band or "window" at the end of clock 19. Actually, however, the automatic zero circuitry for the counters does not require that an automatic zero set operation be initiated, and automatic zero set could be eliminated while automatic zeroing is still accomplished. Also, it is not necessary for automatic zeroing and the automatic zero set operation to be initiated in response to a counter indication within the same band or "window," but instead, each could occur in response to a band peculiar to that operation. To illustrate this separation of the automatic zeroing and automatic zero set functions, the diagram of FIG. 12 shows an exaggerated difference between the bands or windows controlling automatic zeroing and automatic zero set.

Figure 11:
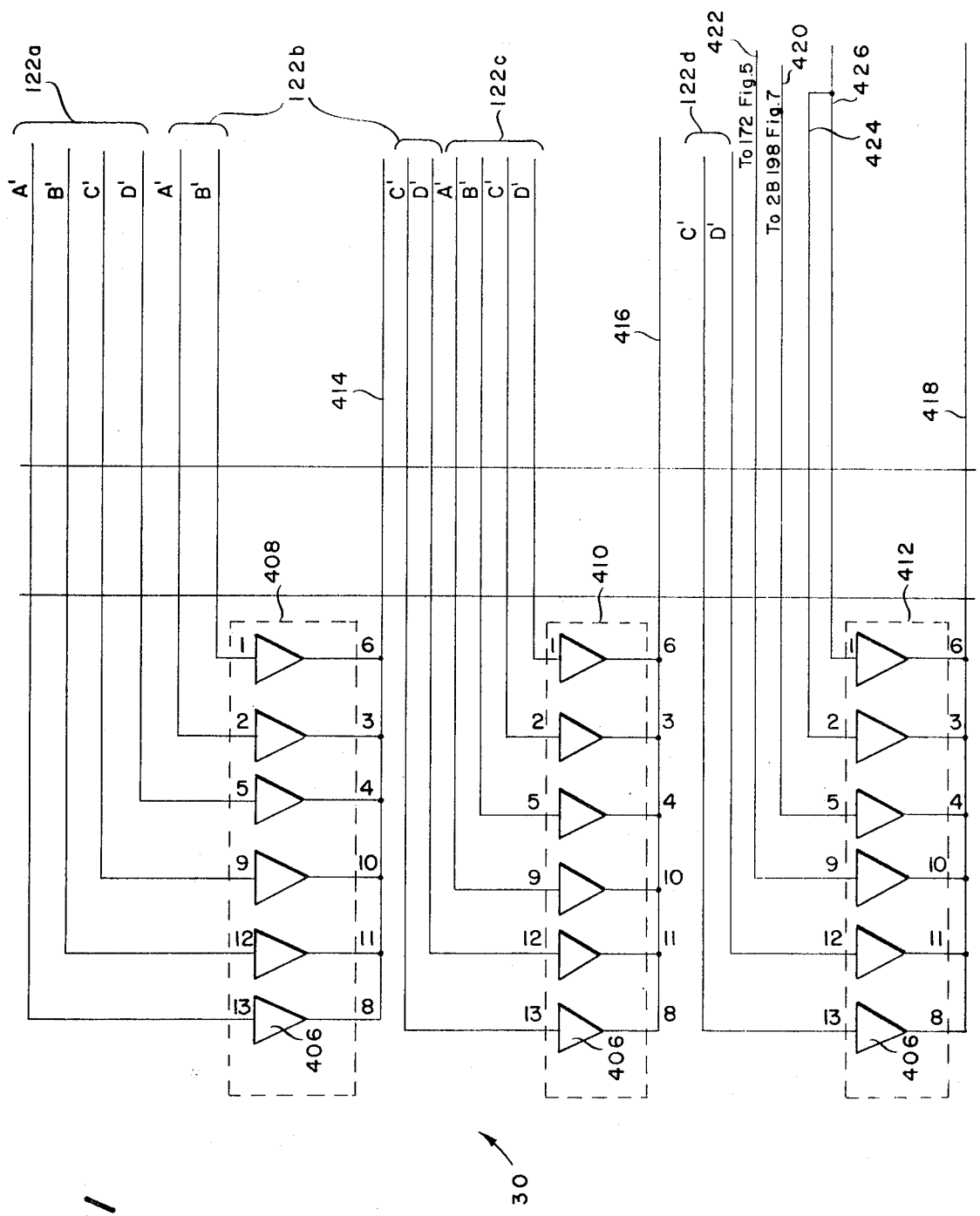
FIG. 11 is a schematic diagram of the zero test unit of FIG. 1.

In FIG. 12, automatic zeroing of the counter 94d is accomplished in exactly the same manner as previously described with regard to FIGS. 10 and 11 with the exception that the automatic zero set unit 36a does not provide an output on line 466 to the zero set latch 38. Thus the automatic zero set unit 36a accomplishes only the automatic zeroing of the counter 94d and does not initiate an automatic zero set operation of the electronic measuring unit 10.

A second zero test unit 30b senses an entirely different numerical range from the output of the RUAD unit 112c, and operates in the manner previously described to control a second automatic zero set unit 36b. This second automatic zero set unit does not include the counter zeroing output 472, but does include the output 466 to provide an activating signal to the zero set latch 38 when the second zero test unit 30b senses a number within a second band or window.

Obviously, the second zero test unit 30b could be connected to be responsive to a second range of numerals at the output of the RUAD unit 112d, and it would be a simple matter to alter the logic circuitry of the zero test unit 30 and automatic zero set unit 36a so that only one of each of these units could be employed to accomplish automatic zeroing and automatic zero set in response to two numerical ranges sensed at the output of a single RUAD unit.

SUMMARY OF OPERATION

The detailed operation of the electronic measuring unit 10 will be readily apparent from a consideration of the foregoing description of the system components. In summary, however, the unit may be programmed through a zero set operation manually to enter into the read up and down counter and display system 24 a binary number preset in the tare control unit 32 individually, or in combination with a value provided by the analog to digital measuring unit 22. In a subsequent not zero set operation, the complement of the value developed in the read up and down counter and display system during zero set operation is re-entered in the counters of the read up and down display system for combination with a value obtained during the not zero set operation.

The manner in which the electronic measuring system 10 functions mathematically to perform these operations will be readily apparent from a review of the following operational tables which, for purposes of description, deal with values obtained during a weighing operation.

ZERO SET Operation (Assume Tare Switch set at 045.0)

| Clock | | Counter | RUAD | Out Display |
|---|---|---|---|---|
| 00–09 | Set Tare in Counters | 04500 | 95499 | — |
| 10–19 | 10 ramps (assume 300 counts/Ramp) = 3000 counts. At end of Clock 19 RUAD Complements in ZERO SET | 07500 | 92499 | — |
| 20–29 | RUAD output to Counter Complement Memory | 07500 | 92499 | — |
| 30–39 | Zero Set Latch reset | | | |
| 40 | System returned to quiescent state. | | | |

| Clock | Operation | Counter | RUAD | Out Display |
|---|---|---|---|---|

FIRST NOT ZERO SET Operation following above ZERO SET Operation. (Assume 38.00 pounds added to scale platform).

| Clock | Operation | Counter | RUAD | Out Display |
|---|---|---|---|---|
| 00–09 | Counter Complement Memory Gate open. Complement read to Counters | 92499 | 07500 | — |
| 10–19 | 10 Ramps. (Each Ramp has same 300 Counts/Ramp plus 380 counts/Ramp from weight on platform 6800 Counts. At end of Clock 19 — Indicates no dynamic transition of most significant digit. RUAD will read Complement and minus indicator 396 can be gated ON. | –99299 | 00700 | — |
| 20–29 | Rounding is satisfied by second 0 from right. No extra ramp required. Minus indicator 396 is gated ON. Visual Display Memory Gate open. BCD decoded and sent to Visual Display. | –99299 | 00700 | *007.00 |
| 30–39 | No Change | | | |
| 40 | System returned to quiescent state. | | | |

| Clock | Operation | Counter | RUAD | Out Display |
|---|---|---|---|---|

SECOND NOT ZERO SET Operation following above. (Assume 74.40 pounds total added on scale platform).

| Clock | Operation | Counter | RUAD | Out Display |
|---|---|---|---|---|
| 00–09 | Counter Complement Memory Gate open. Complement read to Counters. | 92499 | 07500 | *007.00 |
| 10–19 | 10 Ramps. (Each Ramp has 300 counts/ Ramp plus 744 counts/Ramp.) 10440 Total + Indicates Dynamic Transition. RUAD read direct. Rounding not satisfied (3 0 or 5) | +02939 | 02939 | *007.00 |
| 20 | Gated memory unit 200 locked in ramping mode. Analog to digital measuring unit ramps until 3 is raised to 0 or 5 (in this case 5). Gated memory unit releases and goes to clock 20 Counts required 11. | +02950 | 02950 | *007.00 |
| 20–29 | Minus indicator 396 gated OFF. Visual Display Memory Gate open, BCD decoded and sent to Visual Display | +02950 | 02950 | 029.50 |
| 30–39 | No Change | | | |
| 40 | System returned to quiescent state. | | | |

| Clock | Operation | Counter | RUAD | Out Display |
|---|---|---|---|---|

THIRD NOT ZERO SET Operation following above. (Assume 45.20 total added pounds on weigh platform).

| Clock | Operation | Counter | RUAD | Out Display |
|---|---|---|---|---|
| 00–09 | Counter Complement Memory Gate open. Complement read to Counters. | 92499 | 07500 | 029.50 |
| 10–19 | 10 Ramps. (Each Ramp has 300 counts Ramp plus 452 counts/ Ramp) 7520 Counts total. + indicates dynamic transition. RUAD read direct. | +00019 | 00019 | 029.50 |
| 20 | ZERO TEST operates (0001 less than 0004). Second digit from right cleared to 0. Rounding satisfied. | +00009 | 00009 | 029.50 |
| 20–29 | Visual Display Memory Gate open, BCD decoded and sent to Visual Display. | +00009 | 00009 | 000.09 |
| 30–39 | No Change | | | |
| 40 | System returned to Quiescent state. | | | |

FOURTH NOT ZERO SET Operation following above. (Assume 44.75 pounds total added to weigh platform).

| Clock | Operation | Counter | RUAD | Out Display |
|---|---|---|---|---|
| 00–09 | Counter Complement Memory Gate open. Complement read to Counters | 92499 | 07500 | 000.09 |
| 10–19 | 10 Ramps. (Each Ramp has 300 counts/Ramp plus 447.5 counts/ Ramp) 7475 Counts total —indicates no dynamic transition. RUAD will read Complement, and Minus indicator can be gated in Clock 20. | –99974 | 00025 | 000.09 |
| 20 | ZERO TEST operates. (0002 less than 0004)—requires rounding to 0 of second digit from right.) Ramp starts. Counts required 16. When rounded, gated memory 200 moves into clock 20 operation. | –99990 | 00009 | 000.09 |
| 20–29 | Minus indicator gated ON, Visual Display Memory Gate open, BCD decoded and sent to Visual Display. | –99990 | 00009 | *000.09 |
| 30–39 | No Change | | | |
| 40 | System returned to quiescent state. | | | |

MODIFIED COUNTER AND DISPLAY SYSTEM

For many applications, it may be desirable to modify the read up and down counter and display system 24 in a manner which will separate the counters providing the count indication to the counter complement memory units from the counters which control the RUAD and visual display units. Such a modified system may by advantageously employed to prevent the loss of measurement indications when a quantity to be measured is inadvertently applied to the sensor input for the analog to digital measuring unit. During an automatic zeroing operation of the electronic measuring unit 10, such an inadvertent application of a quantity could result in the loss of the measurement indication indicative thereof.

FIG. 13 illustrates a slightly modified electronic measuring unit indicated generally at 510 which is adapted to operate a modified read up or down counter and display system 512. As the majority of the operating components forming the electronic measuring unit 510 are identical, both in construction and operation, to those previously described in connection with the electronic measuring unit 10, such identical components will be given the same reference numerals in FIG. 13 for brevity of description.

The primary variations in the electronic measuring system 510 occur in a read up or down counter and display system 512. This read up or down counter and display system includes a plurality of counter and indicator sections 514a–e which are somewhat similar to those included in the counter and display system 24. However, the sections 514a–e are each provided with two counters; namely, a zero loop counter 516 and a read up or down (RUOD) loop counter 518. Both the counters 516 and 518 are of substantially the same construction as the counters 94, and thus digital input pulses are received by divide ten counters 516e and 518e on input lines 520 and 522 respectively. Both the zero loop counters and the RUOD loop counters of the counter and indicator sections 514 are serially connected by count input lines 524 and 526 respectively extending from the output of each counter to the input of a subsequent counter.

The binary outputs from the zero loop counters on output lines A, B, C and D are provided as inputs to a read down unit 528. The purpose of this read down unit is to enter the complement of the zero loop counter output (9 minus zero loop counter content) in the counter complement memories 120.

Referring to FIG. 14, it will be noted that each of the read down units 528 includes a plurality of Exclusive Or circuits 530 which are connected to receive the binary output signals from the outputs A, B, C and D of the zero loop counters 516. The combination of the zero loop counter, the read down unit, and the associated counter complement memory operates in accordance with the following truth table:

TRUTH TABLE

| Dec | A | B | C | D | IA | IB | IC | ID | ZA | ZB | ZC | ZD | Output |
|---|---|---|---|---|---|---|---|---|---|---|---|---|---|
| 0 | 0 | 0 | 0 | 0 | 1 | 0 | 0 | 1 | 1 | 0 | 0 | 1 | 9 |
| 1 | 1 | 0 | 0 | 0 | 0 | 0 | 0 | 1 | 0 | 0 | 0 | 1 | 8 |
| 2 | 0 | 1 | 0 | 0 | 1 | 1 | 1 | 0 | 1 | 1 | 1 | 0 | 7 |
| 3 | 1 | 1 | 0 | 0 | 0 | 1 | 1 | 0 | 0 | 1 | 1 | 0 | 6 |
| 4 | 0 | 0 | 1 | 0 | 1 | 0 | 1 | 0 | 1 | 0 | 1 | 0 | 5 |
| 5 | 1 | 0 | 1 | 0 | 0 | 0 | 1 | 0 | 0 | 0 | 1 | 0 | 4 |
| 6 | 0 | 1 | 1 | 0 | 1 | 1 | 0 | 0 | 1 | 1 | 0 | 0 | 3 |
| 7 | 1 | 1 | 1 | 0 | 0 | 1 | 0 | 0 | 0 | 1 | 0 | 0 | 2 |
| 8 | 0 | 0 | 0 | 1 | 1 | 0 | 0 | 0 | 1 | 0 | 0 | 0 | 1 |
| 9 | 1 | 0 | 0 | 1 | 0 | 0 | 0 | 0 | 0 | 0 | 0 | 0 | 0 |

Upon receipt of an enabling pulse on the input lines 136a–e, the counter complement memory units 120 pass the binary output indications stored therein to the inputs of the RUOD loop counters 518. The outputs A, B, C and D of the RUOD loop counters are then provided as inputs to RUOD units 112, which are identical in construction and operation to the RUAD units 112 of the electronic measuring unit 10.

The operation of the electronic measuring unit 510 closely parallels that of the electronic measuring unit 10. Thus, in zero set operation during clocks 0–9, the control flip flop 16 of the electronic measuring unit 510 locks the sample rate oscillator 12, provides control signals to the clock control unit 20, and triggers the ramp frequency control 18 as previously described. The reset is removed from the units and the tens clocks 192 and 194 and the "0" logic signal on the output 216 of the gate 214 operates to strobe the zero loop counters 516 and RUOD loop counters 518. The gate output 216 is connected to strobe lines 532 for the zero loop counters and strobe lines 534 for the RUOD loop counters. Upon the occurrence of the strobe signal, the counter complement memory 120 (a–e) outputs are entered into the RUOD loop counters 518 (a–e) and the outputs of the Tare Control Unit 32 are entered in Zero Loop Counters 516 (a–e).

When the clock count changes from clock 9 to clock 10, the ramp frequency oscillator in the ramp frequency control unit 18 is caused to decrease the clock pulse rate and to toggle the analog to digital measuring unit 22 into operation. Upon the occurrence of clock 10, the gate 88 permits the ramp control flip flop 84 to accept timing pulses from the ramp frequency control 18. In response to each timing pulse, the ramp control flip flop changes state and causes the ramp control switching circuit 86 to permit the ramp generator 68 to initiate a measuring ramp. Digital pulses are fed by the oscillator 74 through the count out gate 72, and when the second detector 80 changes state, a measurement is complete. The ramp control flip flop 84 again changes state to terminate the passage of pulses through the count out gate 72 and provide a stop ramp signal to the ramp control switch 86. A new ramp is subsequently initiated by the ramp control flip flop upon receipt of another pulse from the ramp frequency control 18.

The electronic measuring unit 510 differs from the electronic measuring unit 10 in that the digital output pulses from the stable oscillator 74 passed by the count out gate 72 are provided directly to the input 522 for the RUOD loop counters 518 and to one input 536a of an inverting gate 538. A second input 536b of the inverting gate is connected to the output ZB of the ungated memory unit 198. Thus during clocks 10–19, the inverting gate operates to pass pulses to the input 520 for the zero loop counters 516. These pulses are inverted relative to the pulses of the same frequency fed directly to the input 522 for the RUOD loop counters 518.

At the termination of clock pulse 19 during zero set operation, the analog to digital measuring unit is disabled and the ramp frequency control unit 18 is caused to again initiate clock pulses at the higher frequency of the clock pulses 0–9. Now, between clocks 20–29, the gate 302 operates under the control of the gated memory unit 200 to provide a "0" output on the line 304 which is connected to the inputs 136a–e of the counter complement memories 120. This results in the gating of the counter complement memories so that the outputs from the zero loop counters 516 and read down units 528 are entered in the counter complement memories. The counter complement memories now contain the complement of the number registered by the zero loop counters.

The remaining operational cycle of the electronic measuring unit 510 to clock 40 and the termination of the zero set cycle is identical to that of the electronic measuring unit 10 previously described.

During a subsequent not zero set operation, the electronic measuring unit 510 again operates in substantially the same manner as did the electronic measuring unit 10. However, between clocks 0 and 9 when a strobe signal occurs on the output line 216 from the gate 214, the contents of the counter complement memories 120 and strobed into the associated RUOD loop counter 518.

With the occurrence of clock 10, the ramp frequency control 18 lowers the frequency of the clock pulses and digital pulses from the analog to digital conversion unit 22 are registered in the zero loop counters 516 and RUOD loop counters 518. Any transition of, the most significant digit entered in the RUOD loop counter 518a is sensed in the same manner as was the most significant digit entered in the counter 94a of FIG. 3. To accomplish this sensing, the dynamic zero transition line 114 is connected between the D output line of the RUOD loop counter 534a and the dynamic zero test flip flop 28. Thus, with no transition occurring in the most significant digit in the RUOD loop counter 518a between clocks 10 and 20, the dynamic zero test flip flop will not change state and a "0" logic signal will be provided from the output 322 (FIG. 10) to the control inputs 124a–e for the RUOD units 112a–e. As previously described, these units will then provide an output which is the complement of the binary number output from the RUOD loop counter associated therewith. However, should a transition in the most significant digit occur between clocks 10 and 20, the dynamic zero flip flop will change state and provide a "1" logic signal to the RUOD control inputs, and the RUOD units will pass the binary indication directly from the RUOD loop counters.

Also in not zero set operation, the number detector 26 in the electronic measuring unit 510 will operate. The number detector input is taken from the lines 122d at the output of the RUOD unit 112d in FIG. 12, and the number sensed by the number detector will constitute the second from the right hand digit in the binary output number provided by the RUOD units. If a 0 digit is sensed by the number detector, a "0" signal will be provided to the "gate" input of the gated memory 200 (FIG. 7), and the gated memory unit is able to operate in a normal manner when the units clock 192 advances the tens clock 194 to clock 20. On the other hand, should the number detector 26 sense a number other than a round number (0 or 5), a "1" signal will be provided to the "gate" input of the gated memory 200 and the gated memory will not cause the ramp frequency control 18 and the gate 88 to terminate the ramping operation in the analog to digital measuring unit 22. Thus the ramp control flip-flop will receive another control pulse, and a new ramp is initiated after clock 20 is registered by the tens clock 194. The analog to digital measuring unit 22 will feed pulses to the RUOD loop counters 518 after clock 20 until the output of the RUOD unit 112d reaches a desired number during this additional ramping. At this point, the number detector causes a "0" logic signal to be provided to the "gate" input of the gated memory unit 200, and the ramping operation will be terminated.

It must be noted that during the rounding operation by the number detector, no pulses are fed from the analog to digital measuring unit to the zero loop counters 516. This results from the action of the gate 538, an input 536b of which is connected to the output ZB of the ungated memory 198. Upon the occurrence of clock 20, the ungated memory is not prevented by the number detector from shifting into clock 20 operation, and the output ZB thereof shifts from a "1" to a "0" signal. The "0" signal on the input 536b to the gate 538 closes the gate, and prevents the passage of digital pulses to the zero loop counters.

The automatic zero set circuit 36 operates with the zero test unit 30 to initiate a zero set cycle during a not zero set operation of the electronic measuring unit 510 in a manner which differs somewhat from the automatic zero set operation previously described in connection with the electronic measuring unit 10. The inverter sections 408, 410 and 412 of the zero test unit (FIG. 11.) receive inputs from the zero test lines 122a, 122b, 122c, and 122d' in FIG. 13, but the output lines 414, 416 and 418 of the inverter sections are connected to inputs 540 a, b, and c of a gate 542 and the inputs 544 a, b and c of a reset gate 546. The gate 542 and reset gate 546 form a modified automatic zero set unit 36. (FIG. 15)

The reset gate 546 operates in a manner corresponding to that of the reset gate 468 in FIG. 10. The reset gate includes an input 544d coupled to the dynamic zero test flip flop 28, and a "1" input signal is provided to this gate input by the dynamic zero test flip flop when a transition has occurred in the most significant digit registered by the RUOD loop counter 518a between clocks 10 and 20. Thus, with a "1" logic signal present on the gate inputs 544a–c, the reset gate provides a "0" signal to the line 472 which is connected to the reset terminal for the RUOD loop counter 518d, and this counter is reset to zero.

In the absence of a transition of the most significant digit registered by the RUOD loop counter 518a, the dynamic zero test flip-flop will provide a "0" input signal to the input 544d of the reset gate. The reset gate is thereby prevented from resetting the RUOD loop counter 518d, and this counter will be reset by operation of the number detector 26.

The presence of a "1" logic signal on the output lines 414, 416 and 418 of the inverter sections 408, 410, and 412 of the zero test unit results in the provision of a "0" logic signal on an output line 548 from the gate 542. This output line is connected to the inputs 136a–e of the counter complement memories 120, and the "0" signal thereon enables the counter complement memories to register the outputs from the read down units 528.

At the end of clock 19, assume for purposes of illustration that 92499 is stored in the counter complement memories 120, the RUOD loop counters register 99986 and the zero loop counters register 07487. There has been no transition of the most significant digit in the RUOD loop counter 518a between clocks 10 and 20, so the RUOD units will provide a complement output 00013. The reset gate 546 will be prevented from resetting the RUOD loop counter 518d by the dynamic zero test flip flop 28, so the number detector 26 will operate after clock 20 to round the number registered by the RUOD loop counters to 99990. The complement at the output of the RUOD units will now be 00009.

At clock 20, the sensed digits on the zero test lines 122a–d are 0001, so that the inputs from the zero test lines 122a, b, c and d' to the inverter sections 408, 410, and 412 of the zero test unit (FIG. 11) will be "0." The outputs of the inverter sections will all be "1," causing the gate 542 to provide an enabling signal to the inputs 136 of the counter complement memories 120. The number 92512 from the read down units 528 will now be entered in the counter complement memories.

Now assume that at the end of clock 19, the number 92499 is still stored in the counter complement memories 120 but that the zero loop counters register 07520 while the RUOD loop counters register 00019. The gate 542 will cause the output of the read down units (92479) to be entered in the counter complement memory units 136. Transition of the most significant digit in the RUOD loop counter 534a occurred between clocks 10 an 20, and the number 00019 will appear at the outputs of the RUOD units 112. Also, the dynamic zero test flip flop 28 will permit the reset gate 546 to zero the RUOD loop counter 518d, thereby altering the RUOD unit output to 00009.

The mathematical operations performed by the electronic measuring unit 510 provide the same results obtained with the electronic measuring unit 10, as will be noted from the following operational tables dealing with values obtained during a weighing operation.

| Clock | Operation | Zero loop counter | Read down out | Counter comp. memory | RUOD loop counters | RUOD out | Display |
|---|---|---|---|---|---|---|---|
| ZERO SET Operation (Assume tare switch set 045.0, 30 pounds uncommitted dead load) | | | | | | | |
| 00-09 | Set tare zero loop counters, set complement RUOD loop counters | 04500 | 95499 | | | | |
| 10-19 | 10 ramps 300 counts/ramp from dead weight 3,000 counts | 07500 | 92499 | | 3000 | 6999 | |
| 20-29 | Read down output to counter complement memory | 07500 | 92499 | 92499 | 3000 | 6999 | |
| 30-39 | Zero set latch reset | | | | | | |
| 40 | System returned to quiescent state | 07500 | 92499 | 92499 | 3000 | 6999 | |
| FIRST NOT ZERO SET Operation (Tare switch 0000. assume 38.00 added pounds) | | | | | | | |
| 00-09 | Set complement RUOD loop counters | 00000 | 99999 | 92499 | 92499 | 07500 | |
| 10-19 | 10 ramps 300 counts/ramp dead weight 380 counts/ramp added weight 680 counts/ramp 6,800 total. Rounding is satisfied at the end of clock 19. No dynamic transition of the most significant digit in the RUOD loop counter. | 06800 | 93199 | 92499 | 99299 | 00700 | |
| 20-29 | Minus indicator 396 is on. Visual display memory gate open BCD decoded to visual display. | 06800 | 93199 | 92499 | 99299 | 00700 | −007.00 |
| 30-39 | No change | | | | | | |
| 40 | System returned to quiescent state | | | | | | |
| SECOND NOT ZERO SET Operation following above (Tare switch set 0000 74.40 added pounds) | | | | | | | |
| 00-09 | Set complement RUOD loop counters | 00000 | 99999 | 92499 | 92499 | 07500 | −007.00 |
| 10-19 | 10 ramps 300 counts/ramp dead weight 744 counts/ramp added weight 1,044 counts/ramp 10,440 total dynamic transition of the most significant digit in the RUOD loop counter. Rounding not satisfied 3≠0 or 5. | 10440 | 89559 | 92499 | 02939 | 02939 | −007.00 |
| 20 | Partial ramp gated memory 200 locked in 1. Analog to digital measuring unit ramps until 3 is raised to 0 or 5 (in this case 5). Gated memory unit releases and goes to normal operation after clock 20. Counts required 11. | 10440 | 89559 | 92499 | 02950 | 02950 | −007.00 |
| 20-29 | Minus indicator 396 gated off visual display memory gate open | 10440 | 89559 | 92499 | 02950 | 02950 | 029.50 |
| 30-39 | No change | | | | | | |
| 40 | System returned to quiescent state | | | | | | |

From the foregoing, it will be readily apparent that the present invention provides a novel electronic measuring unit adapted to provide rapid and accurate measurements and sequential measurement comparisons. The arrangements and types of components utilized within this invention may be subject to numerous modifications, and the invention may be embodied in other specific forms without departing from the essential characteristics thereof. The present embodiment is therefore to be considered in all respects as illustrative and not restrictive, the scope of the invention being indicated by the appended claims, and all changes which come within the meaning and range of equivalency of the claims are intended to be embraced therein.

We claim:

1. An electronic measuring unit comprising measuring means adapted to provide a measurement output signal which is a function of a quantity to be measured, count indication means to receive and register the measurement output signal from said measuring means, said count indication means including counter means operative in response to said measurement output signal to register a numerical value indicative of said measurement output signal, and output control means connected to receive an output from said counter means, said output control means operating in response to control signals received thereby to selectively provide an output representing either the numerical value registered by said counter means or a complement thereof, control signal source means connected to provide control signals to control said output control means, and zero set control means operative to cause said control signal source means to cause said output control means to provide an output representing only the complement of the numerical value registered by said counter means.

2. The electronic measuring unit of claim 1 wherein said count indication means includes memory means connected to receive the output from said output control means, said memory means being operative to store said output and to selectively provide said stored output to the input of said counter means.

3. The electronic measuring unit of claim 2 wherein said count indication means includes indicator means connected to receive the output from said output control means, said indicator means being selectively operable to provide an indication representing the value of said output from said output control means, and said zero set control means is connected to control said output control means and being operable to cause said indicator means to retain a previous indication regardless of the presence of an output from said output control means, said zero set control means being operable to cause said output control means to provide an output representing only the complement of the numerical value registered by said counters to said memory means.

4. The electronic measuring unit of claim 2 which includes control means operative to cause said memory means to provide the output of said output control means stored thereby during a previous operational cycle of said measuring unit to the input of said counter means for combination with a measurement output signal occurring during a subsequent operational cycle.

5. The electronic measuring unit of claim 1 wherein a manually operable switch is connected to activate said zero set control means.

6. The electronic measuring unit of claim 1 wherein said output control means is operative to provide the nines complement of the numerical value registered by said counter means.

7. The electronic measuring unit of claim 1 wherein said zero set control means includes zero test means connected to said count indication means to sense digits registered thereby as a result of said measurement output signal, said zero test means operating when said sensed digits fall within a predetermined range of numerical values to initiate operation of said control signal source means.

8. An electronic measuring unit comprising measuring means adapted to provide a measurement output signal which is a function of a quantity to be measured during a measurement cycle, count indication means connected to receive and register a digital value indicative of the measurement output signal from said measuring means and number detector means connected to said count indication means to sense at the end of said measurement cycle a digit registered thereby as a result of said measurement output signal, said number detector means operating when said sensed digit is other than a predetermined value to cause a signal to be fed to said count indication means to alter the value registered by said count indication means to said predetermined value.

9. The electronic measuring unit of claim 8 wherein said number detector means operates in response to a sensed digit of a value other than that of said predetermined value to cause said measuring means to provide a measurement output signal to said count indication means to alter said sensed digit to said predetermined value.

10. The electronic measuring unit of claim 9 wherein the measurement output signal from said measuring means to said count indication means constitutes pulse signals indicative of the function to be measured, said number detector means operating upon the termination of said pulse signals and in response to a sensed digit at the output of said output control means of a value other than said predetermined value to cause said measuring means to reinitiate a pulse output signal to said count indication means until said count indication means registers said predetermined value.

11. In an electronic measuring unit wherein sensing means provide an input electrical signal which is a function of a quantity to be measured to a measuring means operative during a measuring cycle to provide an output indicative of the amplitude of said input electrical signal, a method for reducing the effects resulting from the natural frequency of vibration of said sensing means which includes initiating a plurality of successive measuring cycles for each single measurement operation to obtain a number of output measurement indications and initiating at least one initial measuring cycle of said measurement operation at any point on a first excursion of the natural frequency curve of said sensing means and to thereafter alternately initiate subsequent measuring cycles for said measuring operation at points on alternating opposed excursions of said natural frequency curve substantially corresponding to the cycle initiation points on said first excursion.

12. The method of claim 11 wherein a plurality of successive measuring cycles are initiated at a plurality of points on said first excursion, an equal number of measuring cycles being initiated at substantially corresponding points on alternating opposed excursions occurring subsequent to said first excursion.

13. A method for cumulative electronic measuring which includes obtaining a decimal code signal which is a function of a first value and indicative of a numerical value therefor, converting said first decimal code signal to provide a second decimal code signal indicative of the complement of said first decimal code signal, obtaining a second value indicative of a quantity subsequently measured, combining said second decimal code signal with said second value to provide a third decimal code signal indicative of the difference between said first and second values, sensing the most significant digit in said third decimal code signal to determine the occurrence of a transition therein during the formation of said third decimal code signal, and converting said third decimal code signal to provide a fourth decimal code signal indicative of the complement of said third decimal code signal upon the non-occurrence of such transition.

14. In an electronic measuring system for sensing a quantity and providing an electrical measurement signal indicative of the value of said quantity to create a numerical indication thereof in an indicator system, a method for cumulatively comparing values obtained during a plurality of successive measuring operations which includes obtaining a first electrical measurement signal during an initial measuring operation, maintaining a previous indication on said indicator system in the presence of said first measurement signal while storing the complement of said first measurement signal, obtaining a second measurement signal during a second measuring operation, employing said second measurement signal with the complement of said first measurement signal to obtain a difference signal, electrically sensing whether the value indicated by said first measurement signal is greater or less than the value indicated by said second measurement signal, and storing said difference signal for use with a subsequent measuring signal to obtain a signal indicative of the value difference therebetween, a signal indicative of a value which is the complement of the value indicated by said difference signal being stored when said first measurement signal is indicative of a value which exceeds the value indicated by said second measurement signal.

15. In an electronic measuring system for sensing a quantity and providing an electrical measurement signal indicative of the value of said quantity to create a numerical indication thereof in an indicator system, a method for cumulatively comparing values obtained during a plurality of successive measuring operations which includes obtaining a first electrical measurement signal during an initial measuring operation, maintaining a previous indication on said indicator system in the presence of said first measurement signal while storing said first measurement signal, obtaining a second measurement signal during a second measuring operation, employing said second measurement signal with said first measurement signal to obtain a difference signal, storing said difference signal for use with a subsequent measurement signal to obtain a subsequent difference signal, and providing said difference signal to said indicator system to obtain a numerical difference indication.

16. An electronic measuring unit comprising measuring means adapted to provide a measurement output signal which is a function of a quantity to be measured, count indication means including counter means operative in response to said measurement output signal to register a numerical value indicative of said measurement output signal, and output control means connected to receive an output from said counter means, said output control means operating to selectively provide an output representing either the numerical value registered by said counter means or a complement thereof, and transition sensing means connected to said counter means to sense a transition of the most significant digit of the numerical value registered thereby from a first to a second value as a result of said measurement output signal, said transition sensing means operating to control said output control means by providing a first control signal to said output control means in response to an occurrence of such transition and a second control signal to said output control means in response to the non-occurrence of such transition.

17. The electronic measuring unit of claim 16 wherein said output control means operates in response to said first control signal to provide an output representing the numerical value registered by said counter means and in response to said second control signal to provide an output representing the complement of said numerical value.

18. The electronic measuring unit of claim 16 wherein said count indication means includes memory means connected to receive the output from said output control means, said memory means being operative to store said output and to selectively provide said stored output to the input of said counter means.

19. The electronic measuring unit of claim 18 which includes control means operative to cause said memory means to provide the output of said output control means stored thereby during a previous operation cycle of said measuring unit to the input of said counter means for combination with a measurement output signal occurring during a subsequent operational cycle.

20. The electronic measuring unit of claim 19 which includes zero set control means connected to control said output control means, said zero set control means being operative when activated to cause said output control means to provide an output representing only the complement of the numerical value registered by said counters to said memory means.

21. The electronic measuring unit of claim 20 which includes zero test means connected to the output of said output control means to sense the digits appearing as a result of the measurement output signal registered by said counter means, said zero test means operating when said sensed digits fall within a predetermined range of numerical values to initiate operation of said zero set means.

22. The electronic measuring unit of claim 21 which includes automatic zeroing means activated by said zero test means when said sensed digits fall within a predetermined range of numerical values to zero said counter means.

23. The electronic measuring unit of claim 22 wherein said zero test means activates said automatic zeroing means when said sensed digits fall within a first predetermined range of numerical values and activates said zero set control means when said sensed digits fall within a second predetermined range of numerical values, said second range of the numerical values differing from said first range.

24. The electronic measuring unit of claim 19 which includes zero test means connected to said count indication means to sense digits registered thereby as a result of said measurement output signal, and automatic zeroing means activated by said zero test means when said sensed digits fall within a predetermined range of numerical values to zero said counter means.

25. The electronic measuring unit of claim 16 wherein said counter means includes first counter means and second counter means connected to receive said measurement output signal, said second counter means being connected to provide an output to said output control means, said count indication means including memory means connected to provide an input to said counter means and count down means connected between said first counter means and said memory means, said count down means operating to receive an output representing the numerical value registered by said first counter means and to provide the complement of such numerical value to said memory means.

26. The electronic measuring unit of claim 25 wherein said transition sensing means is connected to said second counter means to sense a transition of the most significant digit registered thereby from a first to a second value as a result of said measurement output signal.

27. The electronic measuring unit of claim 26 wherein said output control means operates in response to said first control signal to provide an output representing the numerical value registered by said second counter means and in response to said second control signal to provide an output representing the complement of said numerical value.

28. The electronic measuring unit of claim 25 which includes number detector means connected to the output of said output control means to sense a digit of the numerical indication provided thereby, said number detector means operating when said sensed digit is other than a predetermined value to cause said measuring means to provide an additional measurement output signal to said second counter means to alter said sensed digit to said predetermined value, and means to prevent said additional measurement output signal from reaching said first counter means.

29. The electronic measuring unit of claim 25 which includes means connected to zero said second counter means, zero test means connected to the output of said output control means to sense when the digits of the numerical indication provided thereby fall within a predetermined range of numerical values relative to zero, said zero test means operating when said sensed digits fall within said predetermined range to cause said zeroing means for said second counter means to zero said second counter means.

30. An electronic measuring unit comprising measuring means adapted to provide a measurement output signal which is a function of a quantity to be measured, count indication means to receive and register the measurement output signal from said measuring means, said count indication means including counter means operative in response to said measurement output signal to register a numerical value indicative of said measurement output signal, and output control means connected to receive an output from said counter means, said output control means operating to selectively provide an output representing either the numerical value registered by said counter means or a complement thereof, and number detector means connected to said count indication means to sense a digit registered thereby as a result of said measurement output signal, said number detector means operating when said sensed digit is other than a predetermined value to alter the value of said digit registered by said count indication means to said predetermined value.

31. The electronic measuring unit of claim 30 wherein said number detector means operates in response to a sensed digit of a value other than that of said predetermined value to cause said measuring means to provide a measurement output signal to said count indication means to alter said sensed digit to said predetermined value.

32. The electronic measuring unit of claim 31 wherein the measurement output signals from said measuring means to said count indication means constitute digital pulse signals, said measuring means operating to provide digital pulse output signals which are a function of the quantity to be measured to said counter means and said number detector means operating upon the termination of said digital pulse signals in response to a sensed digit at the output of said output control means of a value other than said predetermined value to cause said measuring means to reinitiate a digital output signal to said counter means until said counter means causes the predetermined value for said sensed digit to occur at the output of said output control means.

33. An electronic measuring unit comprising measuring means adapted to provide a measurement output signal which is a function of a quantity to be measured, count indication means to receive and register the measurement output signal from said measuring means, said count indication means including counter means operative in response to said measurement output signal to register a numerical value indicative of said measurement output signal, and output control means connected to receive an output from said counter means, said output control means operating to selectively provide an output representing either the numerical value registered by said counter means or a complement thereof, zero set control means connected to control said output control means, said zero set control means being operative to cause said output control means to provide an output representing only the complement of the numerical value registered by said counter means and zero test means connected to said count indication means to sense digits registered thereby as a result of said measurement output signal, said zero test means operating when said sensed digits fall within a predetermined range of numerical values to initiate operation of said zero set means.

34. An electronic measuring unit comprising measuring means operative during a measuring cycle to provide a measurement output signal which is a function of a quantity to be measured, count indication means connected to receive and register the measurement output signal from said measuring means and programming means operable to program said measuring unit during an automatic cycle of operation, said programming means including pulse source means to provide clock control pulses and program control means connected to receive said clock control pulses and operative upon the occurrence of a first number of clock control pulses to successively activate said measuring means in response to clock control pulses occurring between said first number of clock control pulses and a second number of clock control pulses to provide a plurality of measuring cycles, said program control means operating upon the occurrence of said first number of clock control pulses to cause said pulse source means to change the frequency of the clock control pulses to provide an elapsed time between clock control pulses greater than the time required for one said measuring cycle.

35. The electronic measuring unit of claim 34 wherein said count indication means includes counter means operative in response to said measurement output signal to register a numerical value indicative thereof, output control means connected to receive an output from said counter means, said output control means operating to selectively provide an output representing either the numerical value registered by said counter means or a complement thereof, and memory means connected between said output control means and the input to said counter means to receive and store the output from said output control means, said program control means operating during the automatic cycle of operation in response to a clock control pulse occurring before the occurrence of said first number of clock pulses to cause said memory means to provide said stored output to the input of said counter means.

36. The electronic measuring unit of claim 35 which includes transition sensing means activated by said program control means in response to a clock control pulse occurring after the occurrence of said second number of clock control pulses, said transition sensing means being connected to said counter means to sense a transition of the most significant digit registered thereby from a first to a second value as a result of said measurement output signal and operative to provide a first control signal to said output control means in response to an occurrence of such transition and a second control signal to said output control means in response to the non-occurrence of such transition, said output control means operating in response to said first control signal to provide an output representing the numerical value registered by said counter means and in response to said second control signal to provide an output representing the complement of said numerical value.

37. The electronic measuring unit of claim 36 which includes zero set control means connected to control said output control means, said zero set control means being operative to cause said program control means to bypass said transition sensing means and cause said output control means to provide an output representing only the complement of the numerical value registered by said counters.

38. The electronic measuring unit of claim 37 wherein said count indication means includes indicator means connected to receive the output from said output control means, said indicator means being selectively activated by said program control means upon the occurrence of a clock control pulse subsequent to the occurrence of said second number of clock control pulses to provide an indication representing the value of the output from said output control means.

39. The electronic measuring unit of claim 38 wherein said zero set control means is operative to cause said program control means to bypass said indicator means whereby said indicator means will not operate to provide an indication representing the value of the output from said output control means.

40. The electronic measuring unit of claim 39 which includes zero test means connected to said count indication means and operative by said program control means before the operation thereby of said indicator means but subsequent to the occurrence of said second number of clock control pulses to sense digits registered by said count indication means as a result of said measurement output signal, said zero test means operating when said sensed digits fall within a predetermined range of numerical values to initiate operation of said zero set means.

41. In an electronic measuring unit including sensing means having a natural frequency of vibration operative to provide an electrical input signal which is a function of a quantity to be measured and which varies cyclically in accordance with the opposed excursions of the natural frequency of vibration of said sensing means, measuring means for receiving said input signal and providing an output during a measuring cycle which is indicative of the amplitude of said input signal, measuring control means for sequentially actuating said measuring means to execute a plurality of sequential measuring cycles during a single measuring operation, said control means being operative to activate said measuring means to initiate at least one initial measuring cycle of a measuring operation at any point on a first excursion of the natural frequency curve of said sensing means and to thereafter alternately initiate subsequent measuring cycles for said measuring operation at points on alternating opposed excursions of said natural frequency curve substantially corresponding to the cycle initiation points on said first excursion and input signal receiving means connected between said sensing means and measuring means to remove AC variations caused by an AC component in said input signal, said input means including means to provide an AC signal corresponding to the AC component in said input signal but inverse thereto for combination with said input signal.

42. A counter and display system for receiving and registering a number comprising counter means for receiving and registering said number and providing an output indicative thereof, said counter means including a plurality of counter section means, each operative to provide an output indicative of one digit of said registered number, read up and down output control means connected to receive the output from said counter means, said read up and down output control means operating to selectively provide an output representing either the numerical value registered by said counter means or a complement thereof and transition sensing means connected to said counter means to sense a transition of the most significant digit registered thereby from a first to a second value, said transition sensing means operating to provide a first control signal to said read up and down output control means in response to an occurrence of such transition and a second control signal to said read up and down output control means in response to a non-occurrence of such transition, said read up and down output control means operating in response to said first control signal to provide an output representing the numerical value registered by said counter means and in response to a second control signal to provide an output representing a complement of said numerical value.

43. The counter and display system of claim 42 wherein memory means are connected between the output of said read up and down output control means and said counter means, said memory means being operative to store the output of said read up and down output control means and to selectively provide said stored output to said counter means, said counter means operating to mathematically combine the stored output from said memory means with a number subsequently received thereby and to register the result of such combination.

44. The counter and display system of claim 42 wherein said read up and down output control means is operative in response to said second control signal to provide an output representing the nines complement of the numerical value registered by said counter means.

45. An electronic measuring unit comprising measuring means operative during a measuring cycle to provide a measurement output signal which is a function of a quantity to be measured, count indication means connected to receive and register the measurement output signal from said measuring means, said count indication means including first and second counter means operative in response to said measurement output signal to register a numerical value indicative thereof, output control means connected to receive an output from said second counter means, said output control means operating to selectively provide an output representing either the numerical value registered by said second counter means or a complement thereof, memory means connected to provide an input to said second counter means, and count down means connected between said first counter means and said memory means, said count down means operating to receive an output representing the numerical value registered by said first counter means and to provide the complement of such numerical value to said memory means, programming means operable to program said measuring unit during an automatic cycle of operation, said programming means including pulse source means to provide clock control pulses and program control means connected to receive said clock control pulses, said program control means operating in response to said clock control pulses to control the operation of said measuring and count indication means, and transition sensing means activated by said program control means and connected to said second counter means to sense a transition of the most significant digit registered thereby from a first to a second value as a result of said measurement output signal, said transition sensing means operating to provide a first control signal to said output control means in response to an occurrence of such transition and a second control signal to said output control means in response to the non-occurrence of such transition, said output control means operating in response to said first control signal to provide an output representing the numerical value registered by said second counter means and in response to said second control signal to provide an output representing the complement of said numerical value, and said program control means operating upon the occurrence of a first number of clock pulses to activate said measuring means and after the occurrence of a second number of clock pulses subsequent to the activation of said measuring means to activate said transition sensing means.

46. The electronic measuring unit of claim 45 wherein said program control means operates upon the occurrence of said first number of clock control pulses to successively activate said measuring means in response to each clock control pulse occurring between said first number of clock control pulses and said second number of clock control pulses, said program control means operating upon the occurrence of said first number of clock control pulses to cause said pulse source means to change the frequency of the clock control pulses to provide an elapsed time between clock control pulses greater than the time required for one of said measuring cycles.

47. The electronic measuring unit of claim 46 which includes number detector means connected to the output of said output control means and operative upon activation by said program control means after the occurrence of said second number of clock-control pulses to sense a digit of the numerical indication provided by said output control means, said number detector means operating when said sensed digit is other than a predetermined value to cause said measuring means to provide an additional measurement output signal to said second counter means to alter said sensed digit to the predetermined value, said program control means including gating means to prevent said additional measurement output signal from reaching said first counter means.

48. The electronic measuring unit of claim 47 which includes zeroing means connected to zero said second counter means, zero test means connected to the output of said output control means and operative upon activation by said program control means after the occurrence of said second number of clock control pulses to sense when the digits of the numerical indication provided by said output control means fall within a predetermined range of numerical values relative to 0, said zeroing means being connected to said zero test means and transition sensing means for operation when said digits sensed by said zero test means fall within said predetermined range and said transition sensing means senses a transition of the most significant digit to provide a zeroing signal to said second counter means, said transition sensing means operating to render said zeroing means inoperative when said transition sensing means fails to sense a transition of the most significant digit to permit alteration of said second counter means by said number detector means.

49. The electronic measuring unit of claim 46 which includes zeroing means connected to zero said second counter means, zero test means connected to the output of said output control means and operative upon activation by said program control means after the occurrence of said second number of clock control pulses to sense when the digits of the numerical indication provided by said output control means fall within a predetermined range of numerical values relative to 0, said zeroing means being connected to said zero test means and transition sensing means for operation when said digits sensed by said zero test means fall within said predetermined range and said transition sensing means senses a transition of the most significant digit to provide a zeroing signal to said second counter means.

50. The electronic measuring unit of claim 46 which includes zero set control means operative to permit a count to be registered by said first counter means and entered in said memory means, said count indication means including indicator means connected to receive the output from said output control means, said indicator means being selectively activated by said program control means upon the occurrence of a clock control pulse subsequent to the occurrence of said second number of clock control pulses to provide an indication of the value of the output from said output control means, said zero set control means operating to prevent said indicator activation by said program control means.

51. An electronic measuring unit comprising measuring means adapted to provide a measurement output signal which is a function of a quantity to be measured, count indication means to receive and register the measurement output signal from said measuring means, said count indication means including counter means operative in response to said measurement output signal to register a numerical value indicative of said measurement output signal, and output control means connected to receive an output from said counter means, said output control means operating to selectively provide an output representing either the numerical value registered by said counter means or a complement thereof, zero test means connected to said count indication means to sense digits registered thereby as a result of said measurement output signal, and automatic zeroing means activated by said zero test means when said sensed digits fall within a predetermined range of numerical values to zero said counter means.

52. The electronic measuring unit of claim 51 which includes zero set control means connected to control said output control means, said zero set control means being operative to cause said output control means to provide an output representing only the complement of the numerical value registered by said counters, said zero test means operating when said sensed digits fall within a predetermined range of numerical values to initiate operation of said zero set means.

53. The electronic measuring unit of claim 52 wherein said zero test means activates said automatic zeroing means when said sensed digits fall within a first predetermined range of numerical values and activates said zero set control means when said sensed digits fall within a second predetermined range of numerical values, said second range of numerical values differing from said first range.

54. An electronic measuring unit comprising measuring means adapted to provide a measurement output signal which is a function of a quantity to be measured during a measurement cycle, count indication means connected to receive and register a digital value indicative of the measurement output signal, zero test means connected to said count indication means to sense the digits registered by said count indication means at the end of said measurement cycle, and automatic zeroing means activated by said zero test means when said sensed digits fall within a predetermined range of values to provide a signal to zero said count indication means.

55. The electronic measuring unit of claim 54 which includes number detector means connected to said count indication means to sense subsequent to said measurement cycle a digit registered thereby as a result of said measurement output signal, said number detector means operating when said sensed digit is other than a predetermined value to cause said measuring means to provide a measurement output signal to said count indication means until said sensed digit is altered to said predetermined value.

56. The electronic measuring unit of claim 54 wherein said count indication means includes counter means operative in response to said measurement output signal to register a digital value indicative of said measurement output signal during said measurement cycle and output control means connected to receive an output from said counter means, said output control means operating to selectively provide an output representing either the numerical value registered by said counter means or a complement thereof, and zero set control means connected to control said output control means, said zero set control means being operative to cause said output control means to provide an output representing only the complement of the numerical value registered by said counters, said zero test means operating when said sensed digits fall within a predetermined range of numerical values to initiate operation of said zero set control means.

57. The electronic measuring unit of claim 56 wherein said zero test means activates said automatic zeroing means when said sensed digits fall within a first predetermined range of numerical values and activates said zero set control means when said sensed digits fall within a second predetermined range of numerical values, said second range of numerical values differing from said first range.

58. A method for obtaining a periodically adjusted reference for use in electronic measuring which includes:
   obtaining a first signal value indicative of the output signal from a measuring means;
   storing said first signal value as a first reference value for subsequent measuring means outputs;
   obtaining a subsequent second signal value indicative of a subsequent second output signal from said measuring means;
   obtaining the algebraic difference between said first and second signal values;
   comparing the algebraic difference between said first and second signal values to a predetermined band of signal values;
   and storing said second signal value as a reference value for subsequent measuring means outputs when said algebraic difference is within said predetermined band.

59. The method of claim 58 which includes retaining said first signal value as a reference for subsequent measuring outputs when said algebraic difference is not within said predetermined band of signal values.

60. The method of claim 59 which includes employing said second signal value to provide a measurement indication.

61. The method of claim 58 which includes periodically obtaining said second signal value and comparing the algebraic difference between each said second signal value with the last stored reference value.

62. The method of claim 58 which includes varying said predetermined band of signal values to vary the band within which said second signal value is stored as a reference for subsequent measuring means outputs.

63. The method of claim 58 which includes obtaining a first digital signal indicative of said first signal value, obtaining a second digital signal indicative of said second signal value, and comparing the algebraic difference between said first and second digital signals to a predetermined band of digital signals.

64. In an electronic measuring system having measuring means adapted to provide a measurement output signal value which is a function of a quantity to be measured, a reference system comprising storage means connected to receive and store a measurement output signal value from said measuring means, reference set means operative to cause said storage means to receive and store a first measurement output signal value from said measuring means as a first reference value, means to receive said first reference value from said storage means and a subsequent second measurement output signal value from said measuring means and operative to provide a difference signal indicative of the algebraic difference between said second measurement output signal value and said first reference value, value determining means connected to receive said difference signal and operative to determine whether said difference signal falls within a predetermined band of signal values, said value determining means operating when said difference signal falls within the predetermined band of signal values to initiate the storage of said second measurement output signal value in said storage means as a reference value for a subsequent measurement output signal.

* * * * *